US009432820B2

(12) United States Patent
Anchan et al.

(10) Patent No.: US 9,432,820 B2
(45) Date of Patent: Aug. 30, 2016

(54) METHOD FOR EFFICIENTLY SUPPORTING MULTIPLE SIMULTANEOUS GROUP PTT CALLS REQUIRING LOW CALL SETUP LATENCY

(71) Applicant: QUALCOMM Incorporated, San Diego, CA (US)

(72) Inventors: Kirankumar Bhoja Anchan, San Diego, CA (US); Arungundram Chandrasekaran Mahendran, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 178 days.

(21) Appl. No.: 14/288,156

(22) Filed: May 27, 2014

(65) Prior Publication Data
US 2014/0355508 A1 Dec. 4, 2014

Related U.S. Application Data

(60) Provisional application No. 61/828,266, filed on May 29, 2013.

(51) Int. Cl.
| | | |
|---|---|---|
| H04H 20/71 | (2008.01) | |
| H04W 4/10 | (2009.01) | |
| H04L 12/18 | (2006.01) | |
| H04W 4/08 | (2009.01) | |
| H04W 76/00 | (2009.01) | |
| H04M 3/56 | (2006.01) | |

(52) U.S. Cl.
CPC .............. *H04W 4/10* (2013.01); *H04L 12/185* (2013.01); *H04L 12/189* (2013.01); *H04L 12/1877* (2013.01); *H04W 4/08* (2013.01); *H04W 76/002* (2013.01); H04M 3/56 (2013.01)

(58) Field of Classification Search
None
See application file for complete search history.

(56) References Cited

U.S. PATENT DOCUMENTS

| | | |
|---|---|---|
| 7,792,935 B2 | 9/2010 | Karjanlahti |
| 7,970,425 B2 | 6/2011 | Balachandran et al. |
| 8,145,250 B2 | 3/2012 | Park et al. |

(Continued)

OTHER PUBLICATIONS

International Search Report and Written Opinion—PCT/US2014/039802—ISA/EPO—Sep. 24, 2014.

(Continued)

*Primary Examiner* — Steven H Nguyen
(74) *Attorney, Agent, or Firm* — Muncy, Geissler, Olds & Lowe, P.C.

(57) ABSTRACT

The disclosure is related to group communications over multicast services. A user equipment (UE) sends a registration request to a server, the registration request indicating communications group(s) in which the UE is interested, receives a message indicating a set of the communications groups that have been assigned pre-established multicast resources, receives call identifiers, the call identifiers mapped to group identifiers of each communications group in the set of the communications groups, stores a mapping of the call identifiers to the group identifiers, and maintains group call sessions for the set of the communications groups. The server receives the registration request, determines that the UE is provisioned for pre-established group calls, retrieves group identifiers for the communications groups, maps call identifiers to the group identifiers, notifies the UE of the set of the communications groups and the mapped call identifiers, and assigns multiple group calls onto pre-established multicast resources.

50 Claims, 22 Drawing Sheets

(56) References Cited

U.S. PATENT DOCUMENTS

| | | |
|---|---|---|
| 8,270,583 B2 | 9/2012 | Newberg et al. |
| 2003/0083087 A1* | 5/2003 | Ekl et al. ............... 455/518 |
| 2004/0246984 A1* | 12/2004 | Hundscheidt et al. ....... 370/432 |
| 2005/0018678 A1* | 1/2005 | Keller et al. ............... 370/390 |
| 2006/0034278 A1* | 2/2006 | Hundscheidt et al. ....... 370/390 |
| 2007/0177592 A1* | 8/2007 | Mooney et al. ............ 370/390 |
| 2012/0163204 A1* | 6/2012 | Oprescu-Surcobe et al. ............... 370/252 |
| 2012/0170501 A1* | 7/2012 | Drozt et al. ............... 370/312 |
| 2012/0172028 A1* | 7/2012 | Korus et al. ............... 455/422.1 |
| 2013/0064160 A1* | 3/2013 | Newberg et al. ........... 370/312 |
| 2013/0279375 A1* | 10/2013 | Newberg et al. ........... 370/260 |
| 2013/0315164 A1 | 11/2013 | Arur et al. |
| 2014/0177436 A1* | 6/2014 | Korus et al. ............... 370/230 |
| 2014/0177437 A1* | 6/2014 | Korus et al. ............... 370/230 |

OTHER PUBLICATIONS

3GPP TR 23.979 V9.0.0 (Dec. 2009), 3rd Generation Partnership Project; Technical Specification Group Services and System Aspects; 3GPP enablers for Open Mobile Alliance (OMA); Push-to-talk over Cellular (PoC) services; Stage 2, (Release 9), 38 pages.

Open Mobile Alliance, "OMA PoC Control Plane, Candidate Version 2.0", OMA-TS-PoC_ControlPlane-V2_0-20080806-C, Aug. 6, 2008, 642 pages.

* cited by examiner

METHOD FOR EFFICIENTLY SUPPORTING MULTIPLE SIMULTANEOUS GROUP PTT CALLS REQUIRING LOW CALL SETUP LATENCY

CROSS-REFERENCE TO RELATED APPLICATIONS

The present application for patent claims the benefit of U.S. Provisional Application No. 61/828,266, entitled "METHOD FOR EFFICIENTLY SUPPORTING MULTIPLE SIMULTANEOUS GROUP PTT CALLS REQUIRING LOW CALL SETUP LATENCY," filed May 29, 2013, assigned to the assignee hereof, and expressly incorporated herein by reference in its entirety.

FIELD OF THE DISCLOSURE

The disclosure is related to efficiently supporting multiple simultaneous group push-to-talk (PTT) calls requiring low call setup latency.

BACKGROUND

A cellular communication system can support bi-directional communication for multiple users by sharing the available system resources. Cellular systems are different from broadcast systems that can mainly or only support unidirectional transmission from broadcast stations to users. Cellular systems are widely deployed to provide various communication services and may be multiple-access systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A cellular system may support broadcast, multicast, and unicast services. A broadcast service is a service that may be received by all users, e.g., news broadcast. A multicast service is a service that may be received by a group of users, e.g., a subscription video service. A unicast service is a service intended for a specific user, e.g., voice call. Group communications can be implemented using either unicast, broadcast, multicast or a combination of each. As the group becomes larger it is generally more efficient to use multicast services. However, for group communication services that require low latency and a short time to establish the group communication, the setup time of conventional multicast channels can be a detriment to system performance.

SUMMARY

The disclosure relates to group communications over multicast services. A method for group communications over multicast services includes sending a registration request from a user equipment (UE) to a server, the registration request indicating one or more communications groups in which the UE is interested and optionally including the UE's intent to register with the server for group communication service, receiving a message from the server indicating a set of the one or more communications groups that have been assigned pre-established multicast resources, receiving one or more call identifiers from the server, the one or more call identifiers mapped to group identifiers of each communications group in the set of the one or more communications groups, storing a mapping of the one or more call identifiers to the group identifiers of each communications group in the set of the one or more communications groups, and maintaining one or more group call sessions for the set of the one or more communications groups, wherein the server assigns multiple group calls to the pre-established multicast resources.

A method for group communications over multicast services includes receiving a registration request from a UE, the registration request indicating one or more communications groups in which the UE is interested, determining that the UE is provisioned for pre-established group calls, retrieving group identifiers for the one or more communications groups, mapping one or more call identifiers to the group identifiers of each communications group in a set of the one or more communications groups, sending a message to the UE indicating the set of the one or more communications groups and the one or more mapped call identifiers, and assigning multiple group calls onto one or more pre-established multicast resources, wherein the UE maintains one or more group call sessions for the set of the one or more communications groups.

An apparatus for group communications over multicast services includes logic configured to send a registration request from a user equipment (UE) to a server, the registration request indicating one or more communications groups in which the UE is interested and optionally including the UE's intent to register with the server for group communication service, logic configured to receive a message from the server indicating a set of the one or more communications groups that have been assigned pre-established multicast resources, logic configured to receive one or more call identifiers from the server, the one or more call identifiers mapped to group identifiers of each communications group in the set of the one or more communications groups, logic configured to store a mapping of the one or more call identifiers to the group identifiers of each communications group in the set of the one or more communications groups, and logic configured to maintain one or more group call sessions for the set of the one or more communications groups, wherein the server assigns multiple group calls to the pre-established multicast resources.

An apparatus for group communications over multicast services includes logic configured to receive a registration request from a user equipment (UE), the registration request indicating one or more communications groups in which the UE is interested, logic configured to determine that the UE is provisioned for pre-established group calls, logic configured to retrieve group identifiers for the one or more communications groups, logic configured to map one or more call identifiers to the group identifiers of each communications group in a set of the one or more communications groups, logic configured to send a message to the UE indicating the set of the one or more communications groups and the one or more mapped call identifiers, and logic configured to assign multiple group calls onto one or more pre-established multicast resources, wherein the UE maintains one or more group call sessions for the set of the one or more communications groups.

An apparatus for group communications over multicast services includes means for sending a registration request from a user equipment (UE) to a server, the registration request indicating one or more communications groups in which the UE is interested and optionally including the UE's intent to register with the server for group communication service, means for receiving a message from the server indicating a set of the one or more communications groups that have been assigned pre-established multicast resources, means for receiving one or more call identifiers from the server, the one or more call identifiers mapped to group identifiers of each communications group in the set of the one or more communications groups, means for storing a mapping of the one or more call identifiers to the group identifiers of each communications group in the set of the one or more communications groups, and means for maintaining one or more group call sessions for the set of the one or more communications groups, wherein the server assigns multiple group calls to the pre-established multicast resources.

An apparatus for group communications over multicast services includes means for receiving a registration request from a user equipment (UE), the registration request indicating one or more communications groups in which the UE is interested, means for determining that the UE is provisioned for pre-established group calls, means for retrieving group identifiers for the one or more communications groups, means for mapping one or more call identifiers to the group identifiers of each communications group in a set of the one or more communications groups, means for sending a message to the UE indicating the set of the one or more communications groups and the one or more mapped call identifiers, and means for assigning multiple group calls onto one or more pre-established multicast resources, wherein the UE maintains one or more group call sessions for the set of the one or more communications groups.

A non-transitory computer-readable medium for group communications over multicast services includes at least one instruction to send a registration request from a user equipment (UE) to a server, the registration request indicating one or more communications groups in which the UE is interested and optionally including the UE's intent to register with the server for group communication service, at least one instruction to receive a message from the server indicating a set of the one or more communications groups that have been assigned pre-established multicast resources, at least one instruction to receive one or more call identifiers from the server, the one or more call identifiers mapped to group identifiers of each communications group in the set of the one or more communications groups, at least one instruction to store a mapping of the one or more call identifiers to the group identifiers of each communications group in the set of the one or more communications groups, and at least one instruction to maintain one or more group call sessions for the set of the one or more communications groups, wherein the server assigns multiple group calls to the pre-established multicast resources.

An non-transitory computer-readable medium for group communications over multicast services includes at least one instruction to receive a registration request from a user equipment (UE), the registration request indicating one or more communications groups in which the UE is interested, at least one instruction to determine that the UE is provisioned for pre-established group calls, at least one instruction to retrieve group identifiers for the one or more communications groups, at least one instruction to map one or more call identifiers to the group identifiers of each communications group in a set of the one or more communications groups, at least one instruction to send a message to the UE indicating the set of the one or more communications groups and the one or more mapped call identifiers, and at least one instruction to assign multiple group calls onto one or more pre-established multicast resources, wherein the UE maintains one or more group call sessions for the set of the one or more communications groups.

BRIEF DESCRIPTION OF THE DRAWINGS

The accompanying drawings are presented to aid in the description of embodiments of the disclosure and are provided solely for illustration of the embodiments and not limitation thereof.

DETAILED DESCRIPTION

Figure 1:
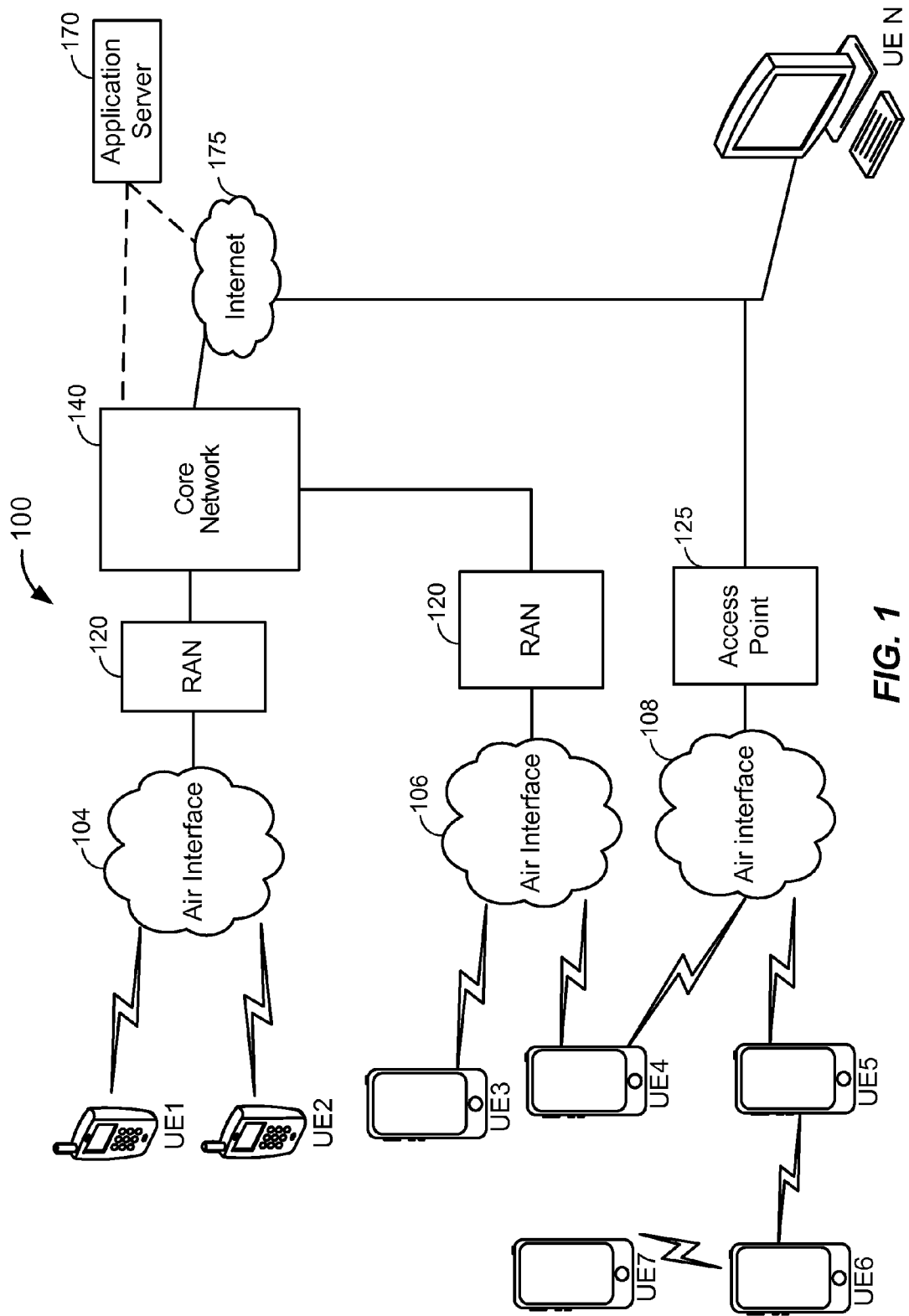
FIG. 1 illustrates a high-level system architecture of a wireless communications system in accordance with an aspect of the disclosure.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an aspect of the disclosure. The wireless communications system 100 contains UEs 1 ... N. The UEs 1 ... N can include cellular telephones, personal digital assistant (PDAs), pagers, a laptop computer, a desktop computer, and so on. For example, in FIG. 1, UEs 1 ... 2 are illustrated as cellular calling phones, UEs 3 ... 5 are illustrated as cellular touchscreen phones or smart phones, and UE N is illustrated as a desktop computer or PC.

Referring to FIG. 1, UEs 1 ... N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., Code Division Multiple Access (CDMA), Evolution-Data Optimized (EV-DO), Evolved High Rate Packet Data (eHRPD), Global System of Mobile Communication (GSM), Enhanced Data rates for GSM Evolution (EDGE), Wideband CDMA (W-CDMA), Long-Term Evolution (LTE), etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 ... N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
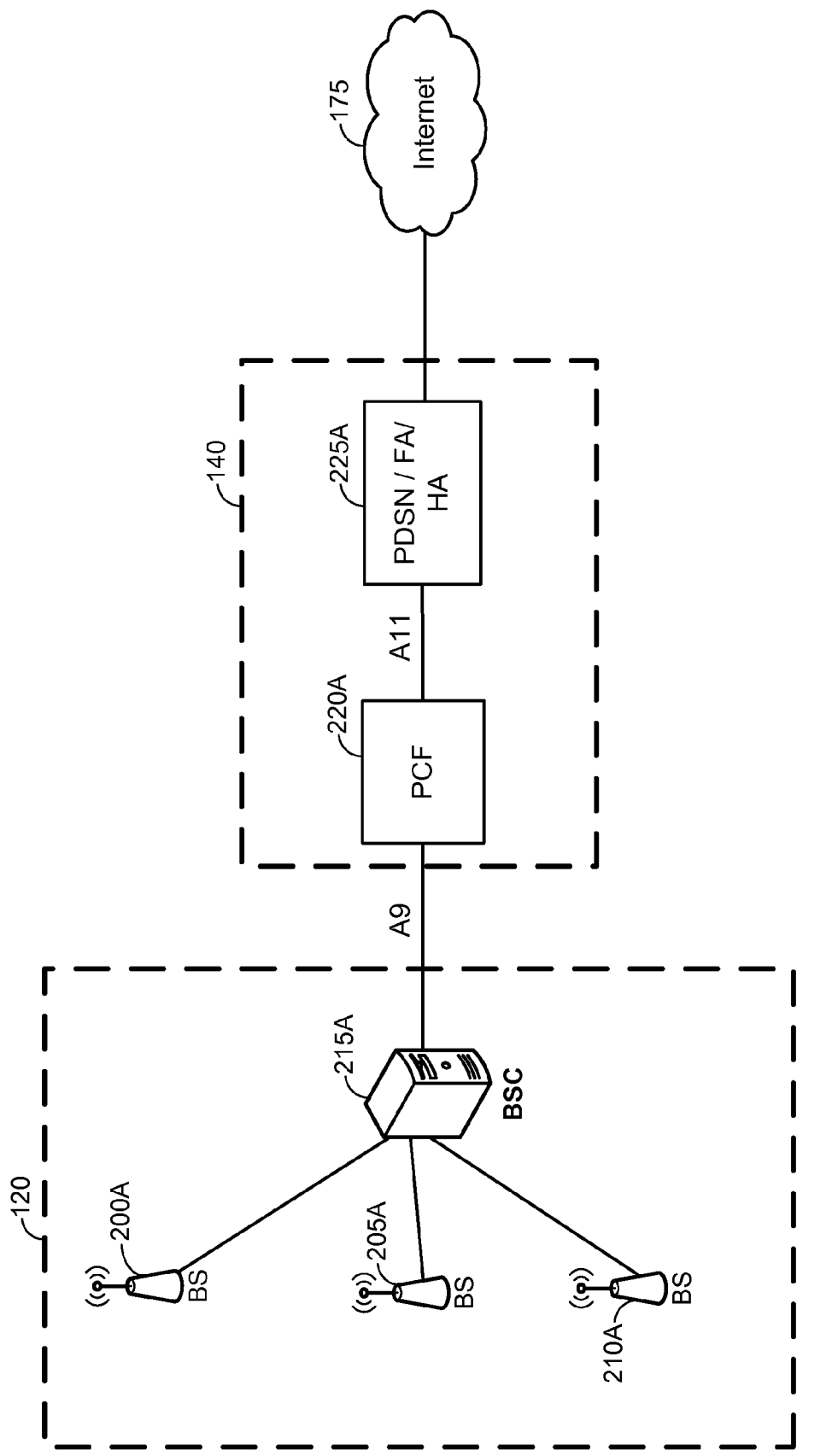
FIG. 2A illustrates an example configuration of a radio access network (RAN) and a packet-switched portion of a core network for a 1xEV-DO network in accordance with an aspect of the disclosure.

FIG. 2A illustrates an example configuration of the RAN 120 and the core network 140 for packet-switched communications in a CDMA2000 1×Evolution-Data Optimized (EV-DO) network in accordance with an aspect of the disclosure. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
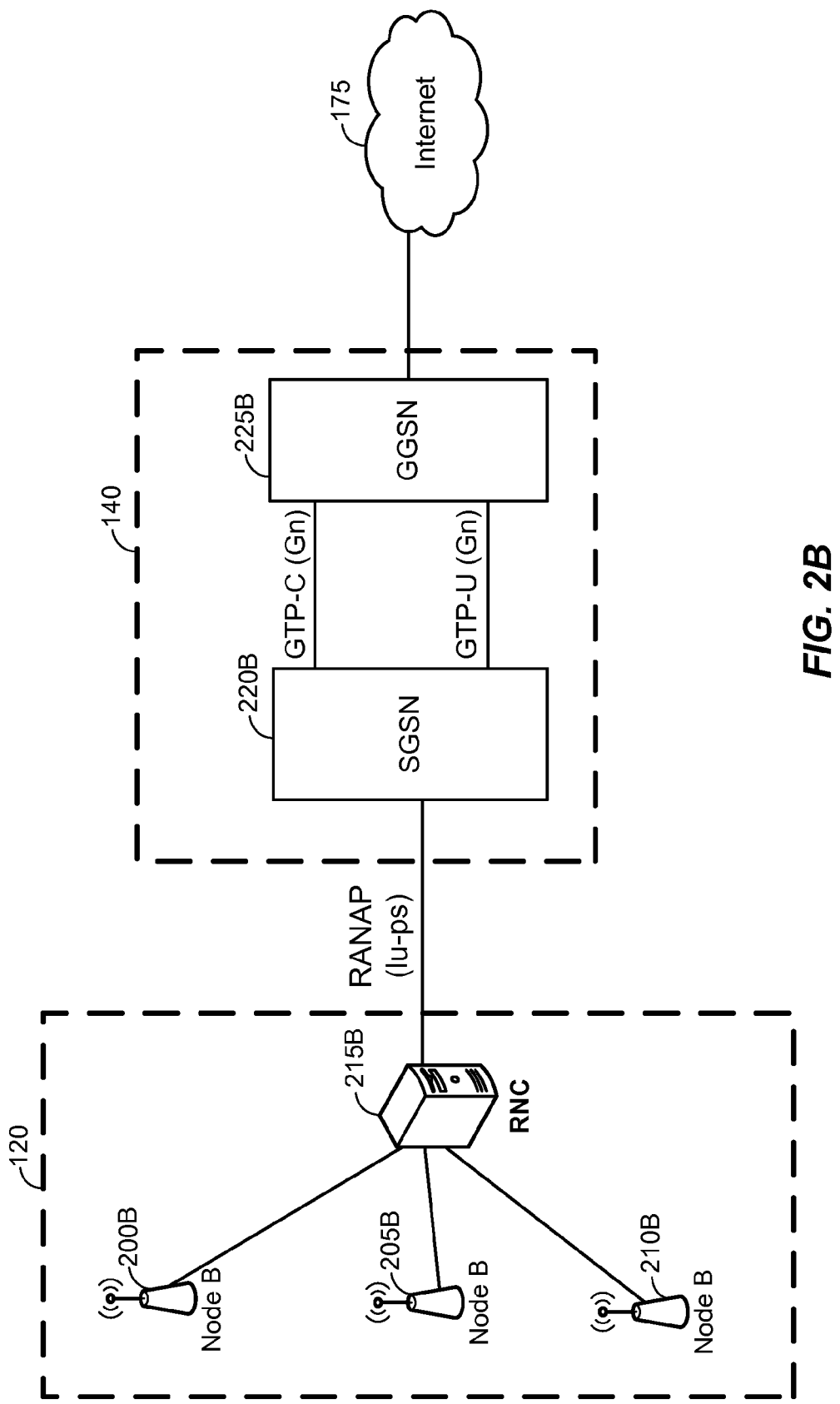
FIG. 2B illustrates an example configuration of the RAN and a packet-switched portion of a General Packet Radio Service (GPRS) core network within a 3G UMTS W-CDMA system in accordance with an aspect of the disclosure.

FIG. 2B illustrates an example configuration of the RAN 120 and a packet-switched portion of the core network 140 that is configured as a GPRS core network within a 3G UMTS W-CDMA system in accordance with an aspect of the disclosure. Referring to FIG. 2B, the RAN 120 includes a plurality of Node Bs 200B, 205B and 210B that are coupled to a Radio Network Controller (RNC) 215B over a wired backhaul interface. Similar to 1×EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of EPS bearers, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a EPS bearer). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more EPS bearers for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or Universal Terrestrial Radio Access Network (UTRAN), in Universal Mobile Telecommunications System (UMTS) architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the example of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
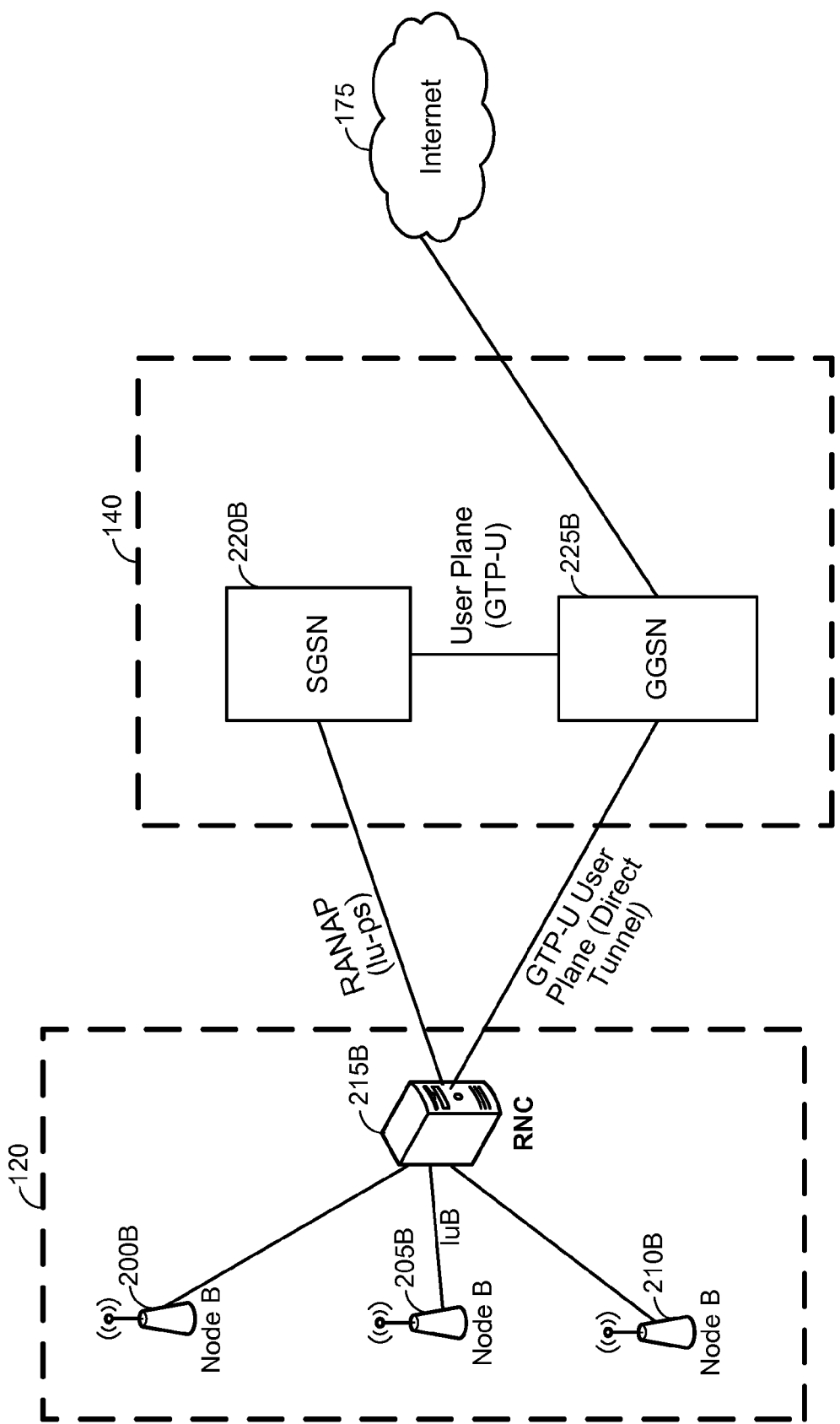
FIG. 2C illustrates another example configuration of the RAN and a packet-switched portion of a GPRS core network within a 3G UMTS W-CDMA system in accordance with an aspect of the disclosure.

FIG. 2C illustrates another example configuration of the RAN 120 and a packet-switched portion of the core network 140 that is configured as a GPRS core network within a 3G UMTS W-CDMA system in accordance with an aspect of the disclosure. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
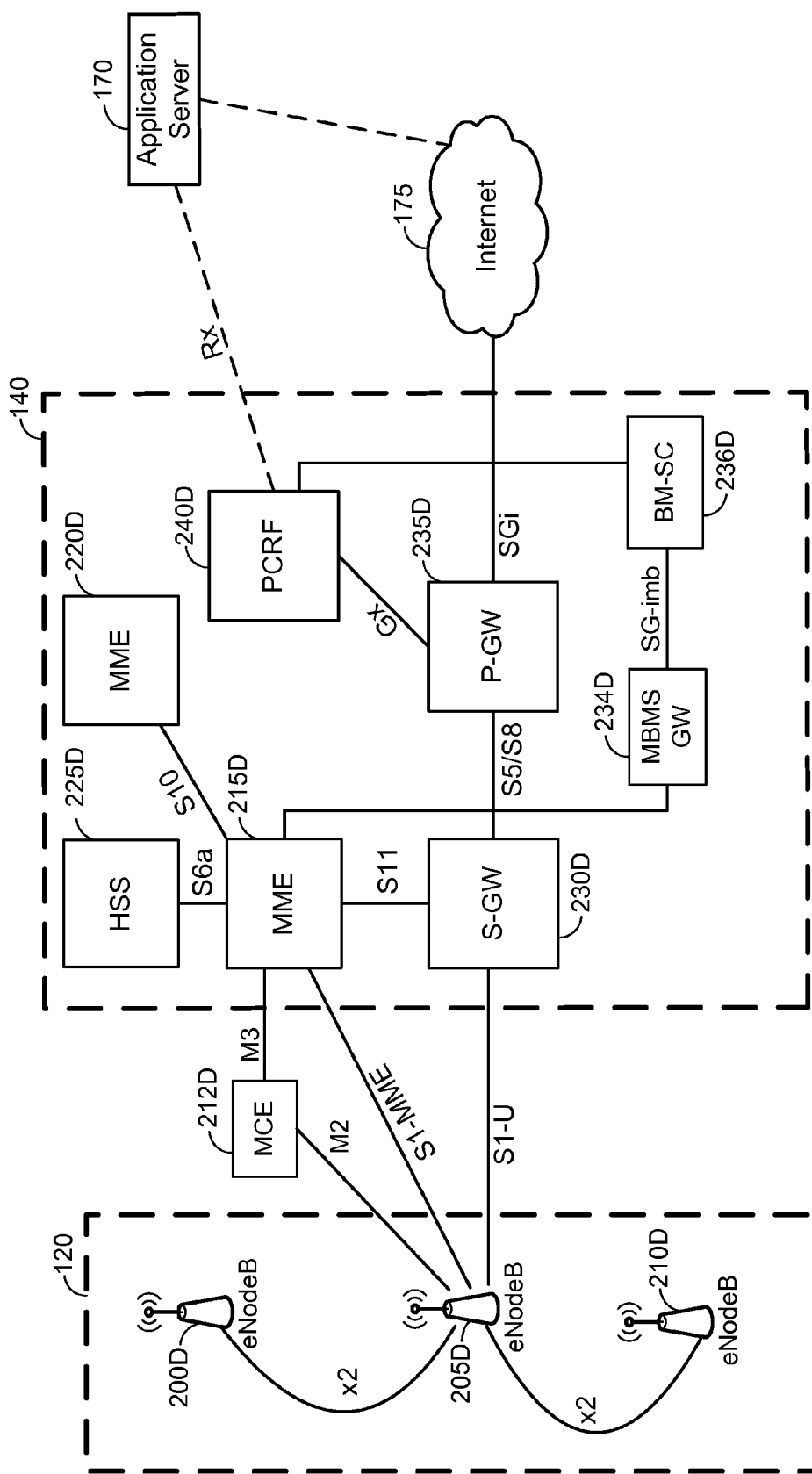
FIG. 2D illustrates an example configuration of the RAN and a packet-switched portion of the core network that is based on an Evolved Packet System (EPS) or Long Term Evolution (LTE) network in accordance with an aspect of the disclosure.

FIG. 2D illustrates an example configuration of the RAN 120 and a packet-switched portion of the core network 140 based on an Evolved Packet System (EPS) or LTE network, in accordance with an aspect of the disclosure. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMES) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
|---|---|
| M2 | Reference point for the control plane between the MCE and the eNodeB. |
| M3 | Reference point for the control plane between the MME and the E-UTRAN. |
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S- GW 230D and P-GW 235D. It is used for S-GW relocation due to UE mobility and if the S-GW 230D needs to connect to a non- collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| SG-imb | The reference point between the BM-SC and the MBMS GW function for MBMS data delivery |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, an MCE 212D is connected to the eNode B 205D via an M2 interface and to the MME 215D via an M3 interface. The MME 215D is connected to the MBMS-GW 234D, which is connected to the BM-SC 236D via an SG-imb interface. The BM-SC 236D is connected to the PCRF 240D. These components will be described in more detail with reference to FIGS. 5A and 5B.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF 240D terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
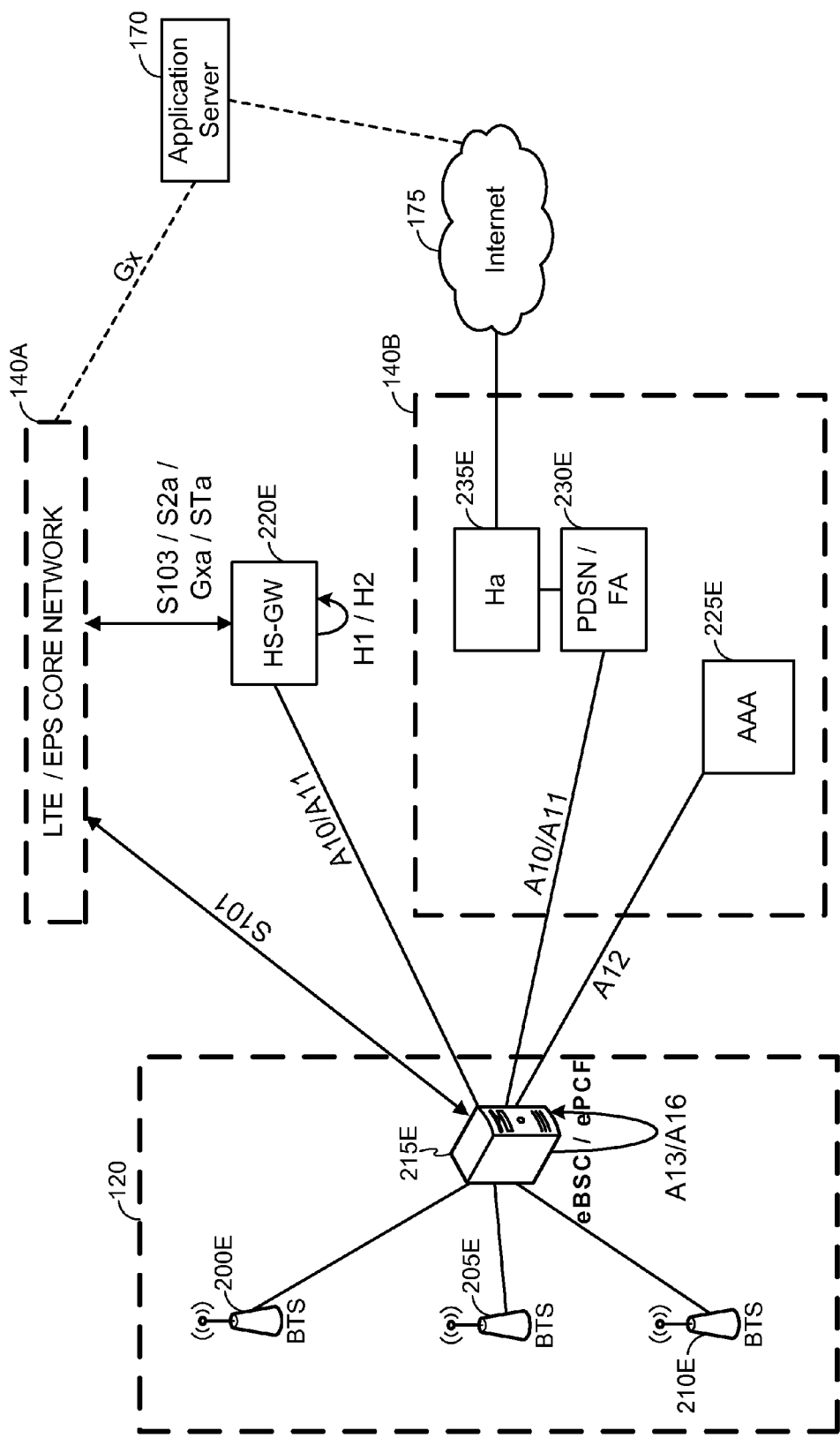
FIG. 2E illustrates an example configuration of an enhanced High Rate Packet Data (HRPD) RAN connected to an EPS or LTE network and also a packet-switched portion of an HRPD core network in accordance with an aspect of the disclosure.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an aspect of the disclosure. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 230D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to evolved packet core (EPC)/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
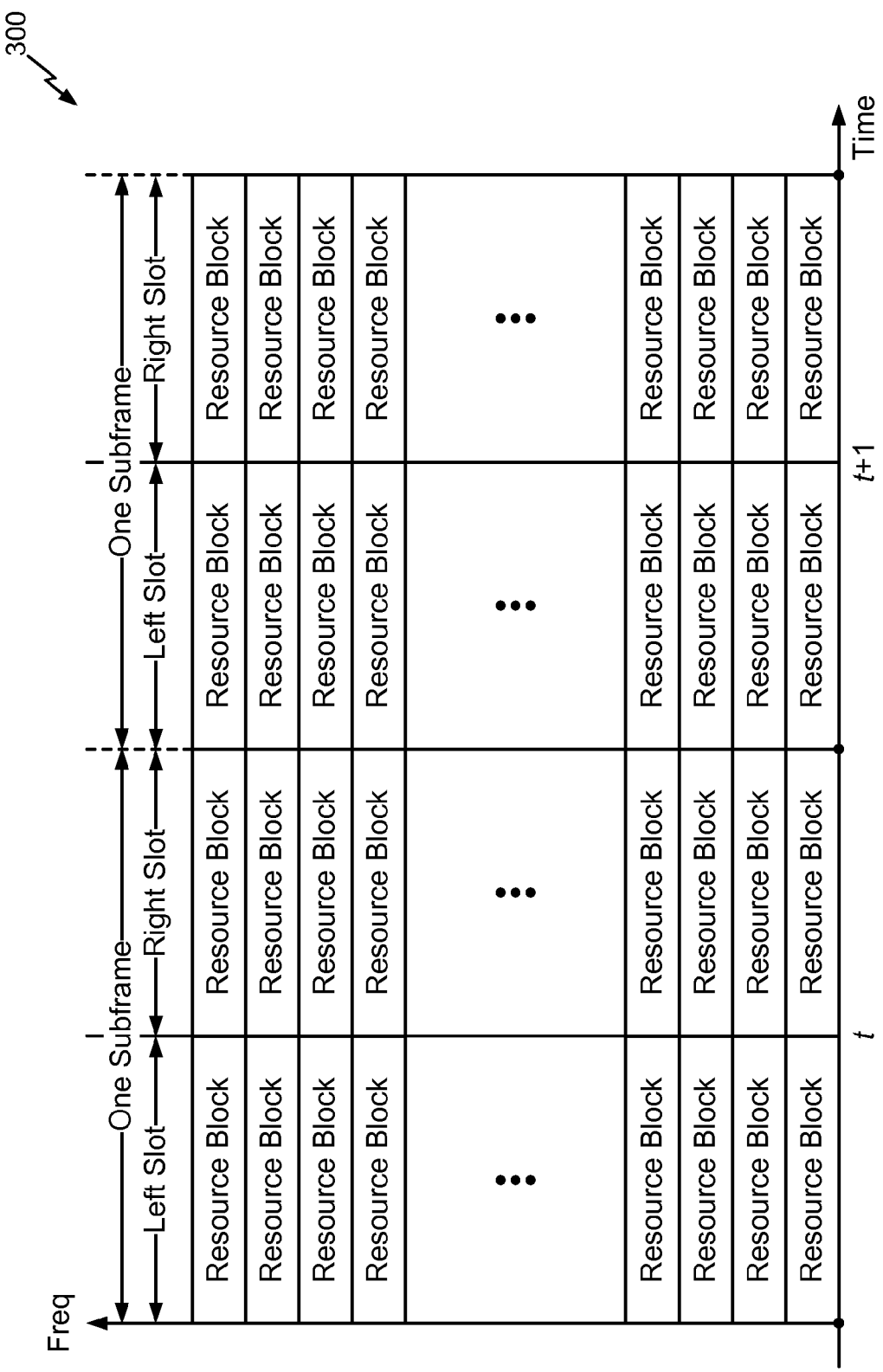
FIG. 3 illustrates an example transmission structure.

FIG. 3 shows an example transmission structure 300 that may be used for the downlink in the wireless communications system 100. The transmission timeline may be partitioned into units of radio frames. Each radio frame may have a predetermined duration (e.g., 10 milliseconds (ms)) and may be partitioned into 10 sub frames. Each sub frame may include two slots, and each slot may include a fixed or configurable number of symbol periods, e.g., six or seven symbol periods.

The system bandwidth may be partitioned into multiple (K) subcarriers with OFDM. The available time frequency resources may be divided into resource blocks. Each resource block may include Q subcarriers in one slot, where Q may be equal to 12 or some other value. The available resource blocks may be used to send data, overhead information, pilot, etc.

The wireless communications system 100 may support evolved multimedia broadcast/multicast services (eMBMS) for multiple UEs as well as unicast services for individual UEs. A service for eMBMS may be referred to as an eMBMS service or flow and may be a broadcast service/flow or a multicast service/flow.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 2 lists some logical channels (denoted as "L"), transport channels (denoted as "T"), and physical channels (denoted as "P") used in LTE and provides a short description for each channel.

TABLE 2

Channels in LTE

| Name | Channel | Type | Description |
|---|---|---|---|
| Broadcast Control Channel | BCCH | L | Carry system information |
| Broadcast Channel | BCH | T | Carry master system Information |
| eMBMS Traffic Channel | MTCH | L | Carry configuration information for eMBMS services. |
| Multicast Channel | MCH | T | Carry the MTCH and MCCH |
| Downlink Shared Channel | DL-SCH | T | Carry the MTCH and other logical channels |
| Physical Broadcast Channel | PBCH | P | Carry basic system information for use in acquiring the system. |
| Physical Multicast Channel | PMCH | P | Carry the MCH. |
| Physical Downlink Shared Channel | PDSCH | P | Carry data for the DL-SCH |
| Physical Downlink Control Channel | PDCCH | P | Carry control information for the DL-SCH |

As shown in Table 2, different types of overhead information may be sent on different channels. Table 3 lists some types of overhead information and provides a short description for each type. Table 3 also gives the channel(s) on which each type of overhead information may be sent, in accordance with one design.

TABLE 3

Overhead Information

| Overhead Information | Channel | Description |
| --- | --- | --- |
| System Information | BCCH | Information pertinent for communicating with and/or receiving data from the system. |
| Configuration Information | MCCH | Information used to receive the Information services, e.g., MBSFN Area Configuration, which contains PMCH configurations, Service ID, Session ID, etc. |
| Control Information | PDCCH | Information used to receive Information transmissions of data for the services, e.g., resource assignments, modulation and coding schemes, etc. |

The different types of overhead information may also be referred to by other names. The scheduling and control information may be dynamic whereas the system and configuration information may be semi-static.

The system may support multiple operational modes for eMBMS, which may include a multi-cell mode and a single-cell mode. The multi-cell mode may have the following characteristics:

Content for broadcast or multicast services can be transmitted synchronously across multiple cells.

Radio resources for broadcast and multicast services are allocated by an MBMS Coordinating Entity (MCE), which may be logically located above the Node Bs.

Content for broadcast and multicast services is mapped on the MCH at a Node B.

Time division multiplexing (e.g., at sub frame level) of data for broadcast, multicast, and unicast services.

The single-cell mode may have the following characteristics:

Each cell transmits content for broadcast and multicast services without synchronization with other cells.

Radio resources for broadcast and multicast services are allocated by the Node B.

Content for broadcast and multicast services is mapped on the DL-SCH.

Data for broadcast, multicast, and unicast services may be multiplexed in any manner allowed by the structure of the DL-SCH.

In general, eMBMS services may be supported with the multi-cell mode, the single-cell mode, and/or other modes. The multi-cell mode may be used for eMBMS multicast/broadcast single frequency network (MBSFN) transmission, which may allow a UE to combine signals received from multiple cells in order to improve reception performance.

Figure 4A:
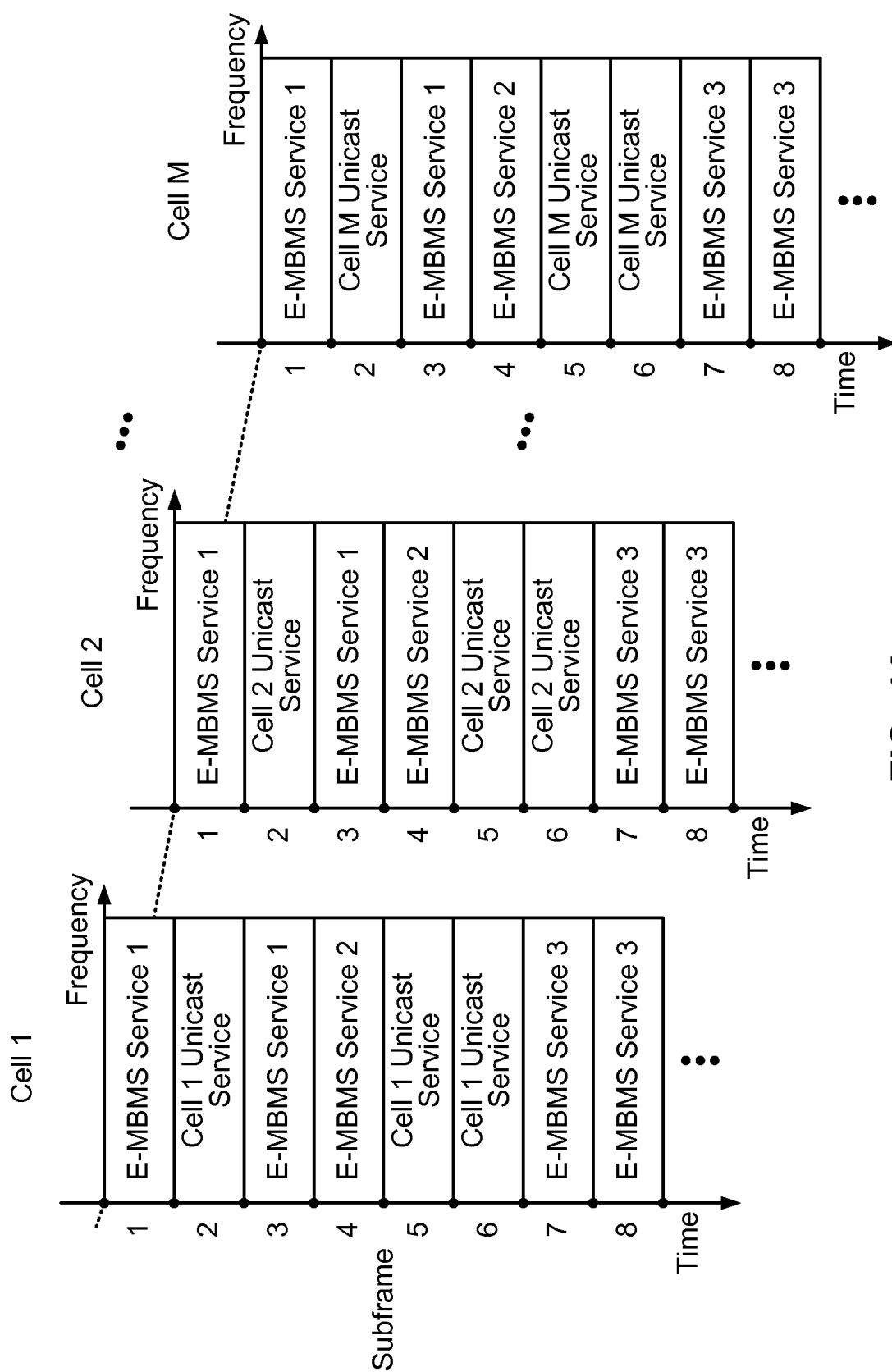
FIG. 4A illustrates example transmissions of different services in a multi-cell mode.

FIG. 4A shows example transmissions of eMBMS and unicast services by M cells 1 through M in the multi-cell mode, where M may be any integer value. For each cell, the horizontal axis may represent time, and the vertical axis may represent frequency. In one design of eMBMS, which is assumed for much of the description below, the transmission time line for each cell may be partitioned into time units of sub frames. In other designs of eMBMS, the transmission time line for each cell may be partitioned into time units of other durations. In general, a time unit may correspond to a sub frame, a slot, a symbol period, multiple symbol periods, multiple slots, multiple sub frames, etc.

In the example shown in FIG. 4A, the M cells transmit three eMBMS services 1, 2 and 3. All M cells transmit eMBMS service 1 in sub frames 1 and 3, eMBMS service 2 in sub frame 4, and eMBMS service 3 in sub frames 7 and 8. The M cells transmit the same content for each of the three eMBMS services. Each cell may transmit its own unicast service in sub frames 2, 5 and 6. The M cells may transmit different contents for their unicast services.

Figure 4B:
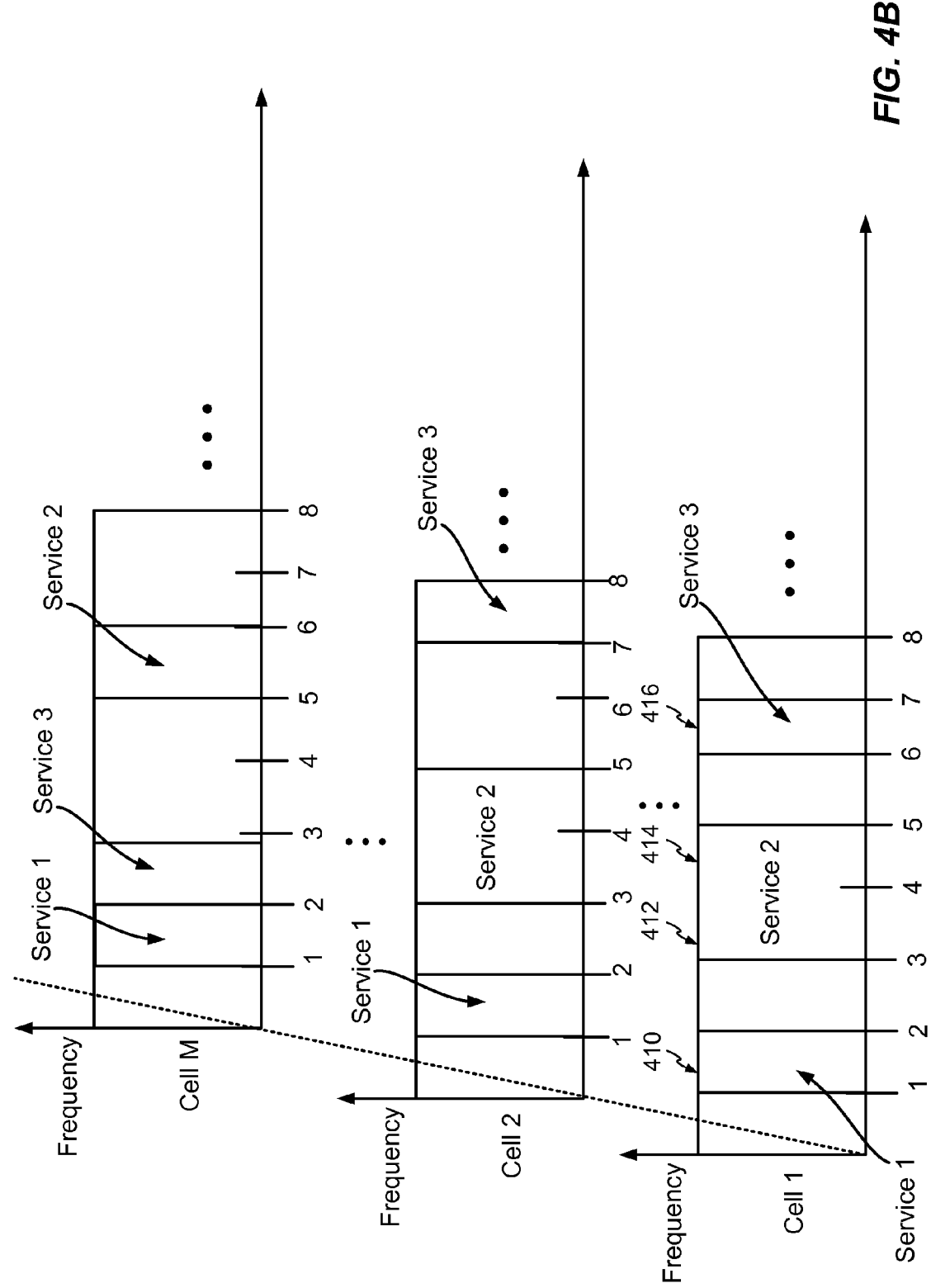
FIG. 4B illustrates example transmissions of different services in a single-cell mode.

FIG. 4B shows example transmissions of eMBMS and unicast services by M cells in the single-cell mode. For each cell, the horizontal axis may represent time, and the vertical axis may represent frequency. In the example shown in FIG. 4B, the M cells transmit three eMBMS services 1, 2 and 3. Cell 1 transmits eMBMS service 1 in one time frequency block 410, eMBMS service 2 in a time frequency blocks 412 and 414, and eMBMS service 3 in one time frequency blocks 416. Similarly other cells transmit services 1, 2 and 3 as shown in the FIG. 4B.

In general, an eMBMS service may be sent in any number of time frequency blocks. The number of sub frames may be dependent on the amount of data to send and possibly other factors. The M cells may transmit the three eMBMS services 1, 2 and 3 in time frequency blocks that may not be aligned in time and frequency, as shown in FIG. 4B. Furthermore, the M cells may transmit the same or different contents for the three eMBMS services. Each cell may transmit its own unicast service in remaining time frequency resources not used for the three eMBMS services. The M cells may transmit different contents for their unicast services.

FIGS. 4A and 4B show example designs of transmitting eMBMS services in the multi-cell mode and the single-cell mode. eMBMS services may also be transmitted in other manners in the multi-cell and single-cell modes, e.g., using time division multiplexing (TDM).

As noted in the foregoing, eMBMS services can be used to distribute multicast data to groups and could be useful in group communication systems (e.g., Push-to-Talk (PTT) calls). Conventional applications on eMBMS have a separate service announcement/discovery mechanism. Further, communications on pre-established eMBMS flows are always on even on the air interface. Power saving optimization must be applied to put the UE to sleep when a call/communication is not in progress. This is typically achieved by using out of band service announcements on unicast or multicast user plane data. Alternatively application layer paging channel like mechanism may be used. Since the application layer paging mechanism has to remain active, it consumes bandwidth on the multicast sub-frame which could be idle in the absence of the paging mechanism. Additionally, since the multicast sub-frame will be active while using the application layer paging, the remainder of the resource blocks within the sub frame cannot be used for unicast traffic. Thus the total 5 Mhz bandwidth will be consumed for the sub frame for instances when application layer paging is scheduled without any other data.

Figure 5A:
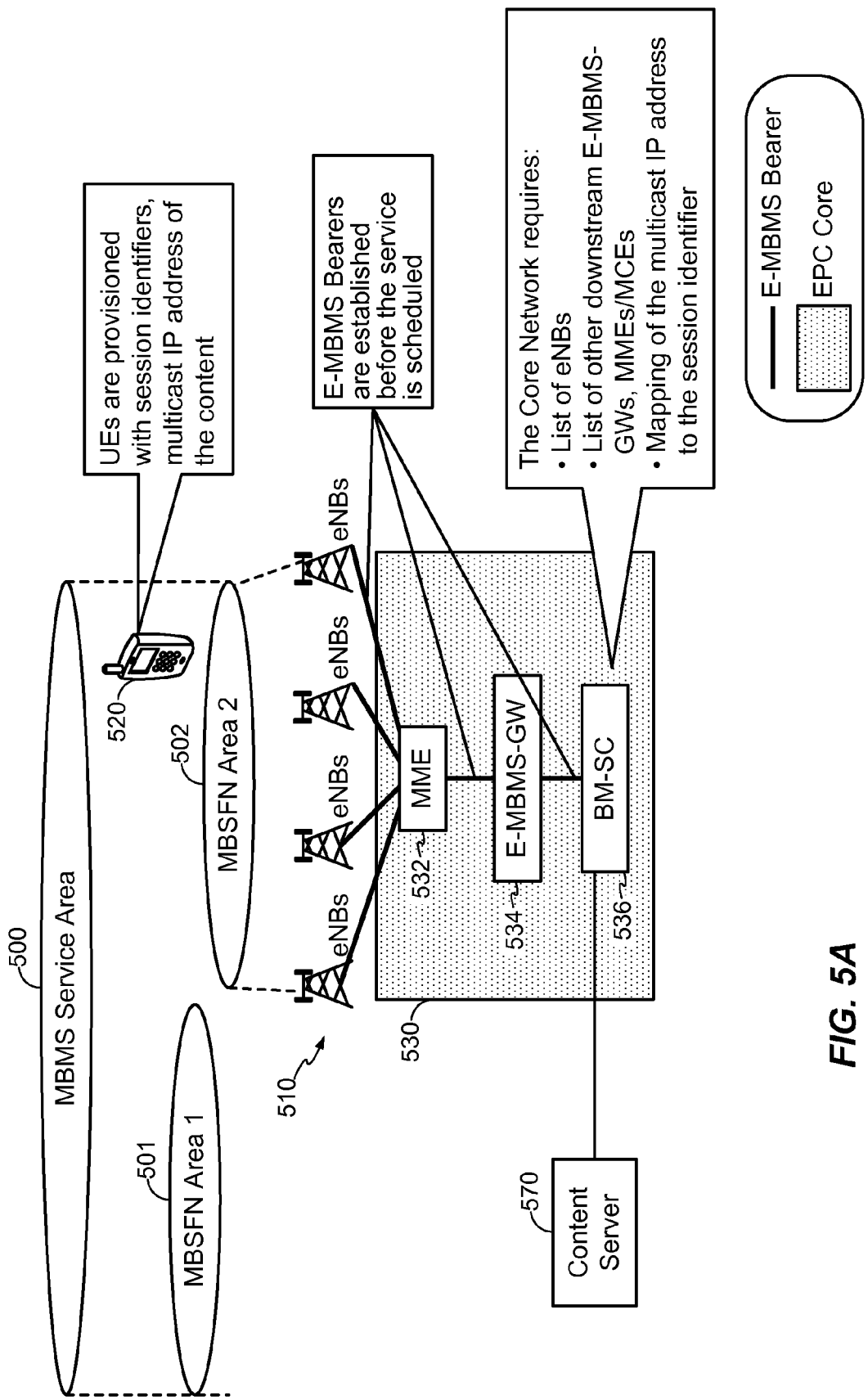
FIGS. 5A and 5B illustrate additional wireless communication systems that can support broadcast/multicast services.

FIG. 5A is another illustration of a wireless network that can implement eMBMS or MBMS services, which are used interchangeably herein. An MBMS service area 500 can include multiple MBSFN areas (e.g. MBSFN area 1, 501 and MBSFN area 2, 502). Each MBSFN area can be supported by one or more eNode Bs 510, which are coupled to a core network 530. Core network 530 can include various elements (e.g., MME 532, eMBMS gateway 534, and broadcast multicast service center (BM-SC) 536 to facilitate controlling and distributing the content from content provider 570 (which may include an application server, etc.) to the MBMS service area 500. The core network 530 may require a list of eNode Bs within the network, list of other downstream E-MBMS-GWs 534, and (Mobility Management Entity) MMEs/MCEs 532, and a mapping of the multicast IP address to the session identifier. UE 520 within the network can be provisioned with session identifiers and multicast IP address of the content sent to it. Typically an MME is a key control node for the LTE access network. It is responsible for idle mode UE tracking and paging procedure including retransmissions. It is involved in the bearer activation/deactivation process and is also responsible for choosing the SGW for a UE at the initial attach and at time of intra-LTE handover involving core network 530 node relocation and the MME is also responsible for authenticating the user. The MME 532 can also check the authorization of the UE to camp on the service provider's Public Land Mobile Network (PLMN) and enforces UE roaming restrictions. The MME 532 is the termination point in the network for ciphering/integrity protection for Non Access Stratum (NAS) signaling and handles the security key management. The MME also provides the control plane function for mobility between LTE and 2G/3G access networks with S3 interface terminating at the MME.

Figure 5B:
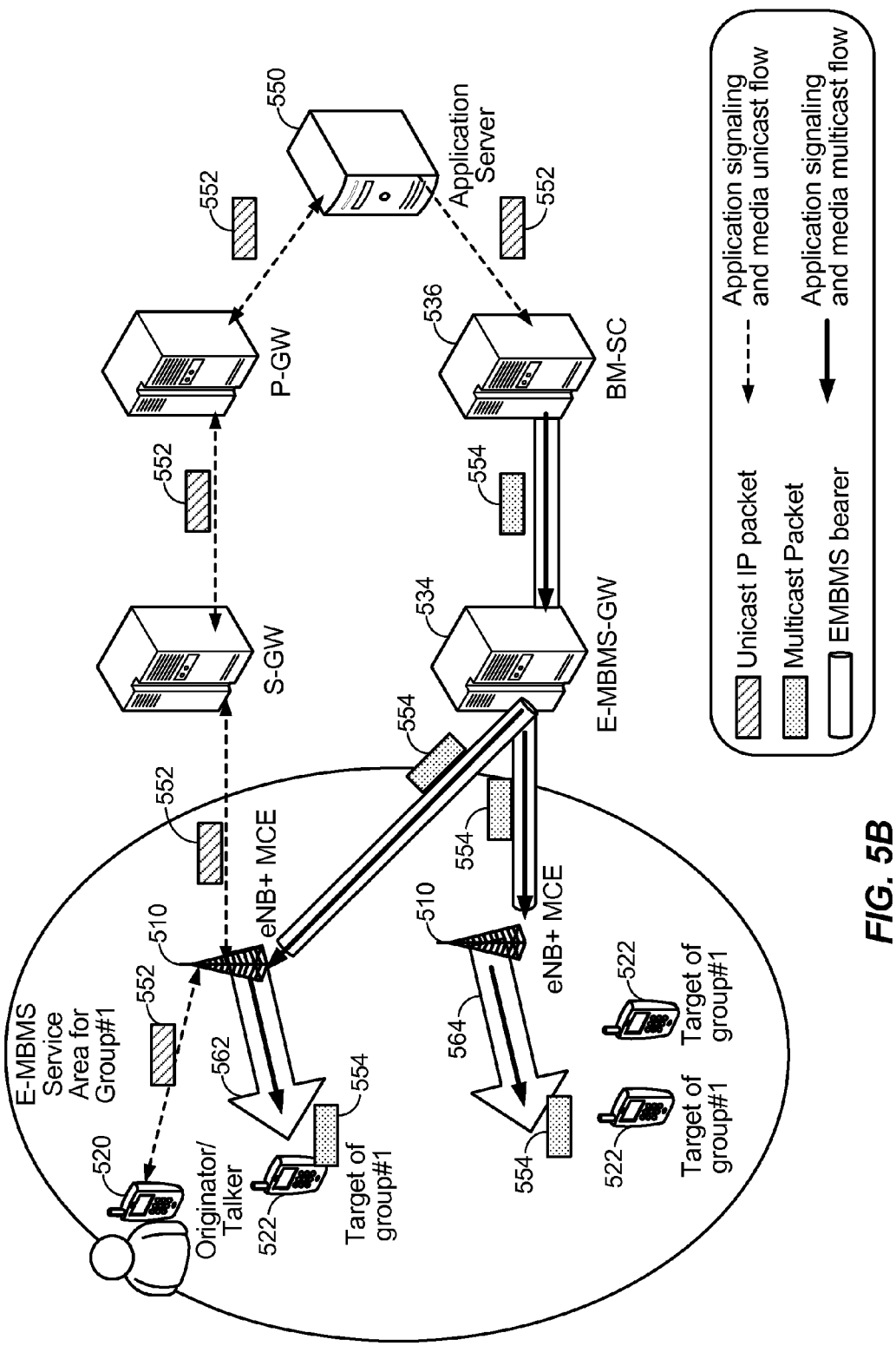

FIG. 5B is another illustration of a wireless network that can implement multimedia broadcast/multicast services (MBMS) as disclosed herein. In the illustrated network an application server 550 (e.g., PTT server) can serve as the content server. The application server 550 can communicate media in unicast packets 552 to the network core where the content can be maintained in a unicast configuration and transmitted as unicast packets to a given UE (e.g., originator/talker 520) or can be converted through the BM-SC to multicast packets 554, which can then be transported target UE's 522. For example, a PTT call can be initiated by UE 520 by communicating with application server 550 via unicast packets 552 over a unicast channel. It will be noted that for the call originator/call talker both the application signaling and media are communicated via the unicast channel on the uplink or the reverse link. The application server 550 can then generate a call announce/call setup request and communicate these to the target UEs 522. The communication can be communicated to the target UEs 522 via multicast packets 554 over a multicast flow, as illustrated in this particular example. Further, it will be appreciated in this example, that both the application signaling and media can be communicated over the multicast flow in the downlink or the forward link. Unlike conventional systems, having both the application signaling and the media in the multicast flow, avoids the need of having a separate unicast channel for the application signaling. However, to allow for application signaling over the multicast flow of the illustrated system, an evolved. packet system (EPS) bearer will be established (and persistently on) between the BM-SC 536, EMBS GW 534, eNBs 510 and target UEs 522.

In accordance with various embodiments disclosed herein some of the downlink channels related to eMBMS will be further discussed, which include.

MCCH: Multicast Control Channel;
MTCH: Multicast Traffic Channel;
MCH: Multicast Channel; and
PMCH: Physical Multicast Channel.

It will be appreciated that multiplexing of eMBMS and unicast flows are realized in the time domain only. The MCH is transmitted over MBSFN in specific sub frames on physical layer. MCH is a downlink only channel. A single transport block is used per sub frame. Different services (MTCHs) can be multiplexed in this transport block, as will be illustrated in relation to FIG. 6.

To achieve low latency and reduce control signaling, one eMBMS flow (562, 564) can be activated for each service area. Depending on the data rate, multiple multicast flows can be multiplexed on a single slot. PTT UEs (targets) can ignore and "sleep" between scheduled sub frames and reduce power consumption when no unicast data is scheduled for the UE. The MBSFN sub frame can be shared by groups in the same MBSFN service area. MAC layer signaling can be leveraged to "wake-up" the application layer (e.g., PTT application) for the target UEs.

Embodiments can use two broadcast streams, each a separate eMBMS flow over an LTE broadcast flow, with its own application level broadcast stream and its own (multicast IP address) for each defined broadcast region 502, 501 (e.g., a subset of sectors within the network). Although illustrated as separate regions, it will be appreciated that the broadcast areas 502, 501 may overlap.

In LTE, the control and data traffic for multicast is delivered over MCCH and MTCH, respectively. The Medium Access Control Protocol Data Units (MAC PDUs) for the UEs indicate the mapping of the MTCH and the location of the a particular MTCH within a sub frame. An MCH Scheduling Information (MSI) MAC control element is included in the first subframe allocated to the MCH within the MCH scheduling period to indicate the position of each MTCH and unused subframes on the MCH. For eMBMS user data, which is carried by the MTCH logical channel, MCH scheduling information (MSI) periodically provides at lower layers (e.g., MAC layer information) the information on decoding the MTCH. The MSI scheduling can be configured and according to this embodiment is scheduled prior to MTCH sub-frame interval.

Figure 6:
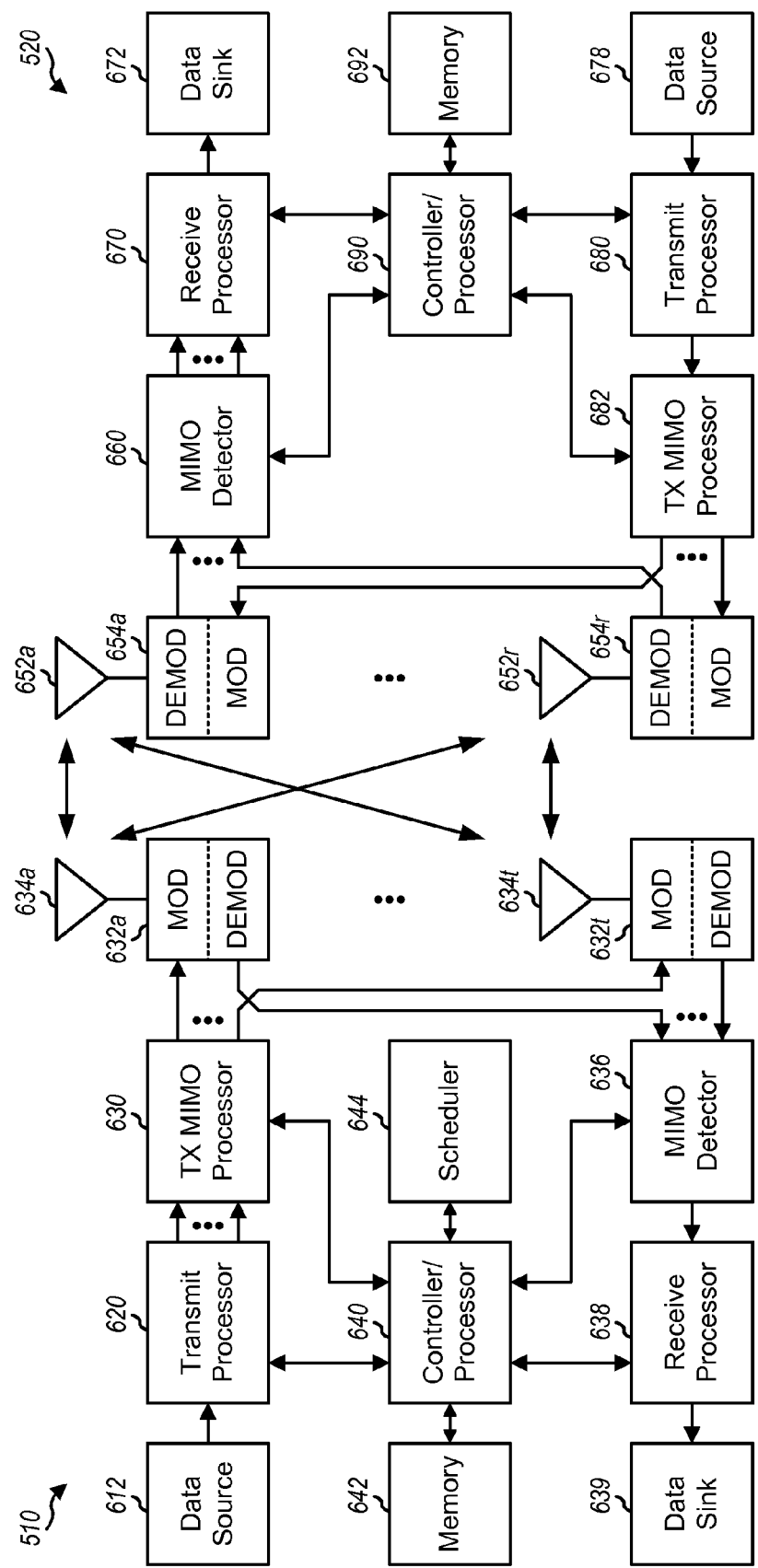
FIG. 6 illustrates a block diagram of a portion of a wireless communication system that can support broadcast/multicast services.

FIG. 6 illustrates a block diagram of a design of an eNode B 510 and UE 520, which may be one of the eNode Bs and one of the UEs discussed herein in relation to the various embodiments. In this design, Node B 510 is equipped with T antennas 634a through 634t, and UE 520 is equipped with R antennas 652a through 652r, where in general T is greater than or equal to 1 and R is greater than or equal to 1.

At Node B 510, a transmit processor 620 may receive data for unicast services and data for broadcast and/or multicast services from a data source 612 (e.g., directly or indirectly from application server 150). Transmit processor 620 may process the data for each service to obtain data symbols. Transmit processor 620 may also receive scheduling information, configuration information, control information, system information and/or other overhead information from a controller/processor 640 and/or a scheduler 644. Transmit processor 620 may process the received overhead information and provide overhead symbols. A transmit (TX) multiple-input multiple-output (MIMO) processor 630 may multiplex the data and overhead symbols with pilot symbols, process (e.g., precode) the multiplexed symbols, and provide T output symbol streams to T modulators (MOD) 632a through 632t. Each modulator 632 may process a respective output symbol stream (e.g., for OFDM) to obtain an output sample stream. Each modulator 632 may further process (e.g., convert to analog, amplify, filter, and upconvert) the output sample stream to obtain a downlink signal. T downlink signals from modulators 632a through 632t may be transmitted via T antennas 634a through 634t, respectively.

At UE 520, antennas 652a through 652r may receive the downlink signals from Node B 510 and provide received signals to demodulators (DEMOD) 654a through 654r, respectively. Each demodulator 654 may condition (e.g., filter, amplify, downconvert, and digitize) a respective received signal to obtain received samples and may further process the received samples (e.g., for OFDM) to obtain received symbols. A MIMO detector 660 may receive and process the received symbols from all R demodulators 654a through 654r and provide detected symbols. A receive processor 670 may process the detected symbols, provide decoded data for UE 520 and/or desired services to a data sink 672, and provide decoded overhead information to a controller/processor 690. In general, the processing by MIMO detector 660 and receive processor 670 is complementary to the processing by TX MIMO processor 630 and transmit processor 620 at Node B 510.

On the uplink, at UE 520, data from a data source 678 and overhead information from a controller/processor 690 may be processed by a transmit processor 680, further processed by a TX MIMO processor 682 (if applicable), conditioned by modulators 654a through 654r, and transmitted via antennas 652a through 652r. At Node B 510, the uplink signals from UE 520 may be received by antennas 634, conditioned by demodulators 632, detected by a MIMO detector 636, and processed by a receive processor 638 to obtain the data and overhead information transmitted by UE 520.

Controllers/processors 640 and 690 may direct the operation at Node B 510 and UE 520, respectively. Scheduler 644 may schedule UEs for downlink and/or uplink transmission, schedule transmission of broadcast and multicast services, and provide assignments of radio resources for the scheduled UEs and services. Controller/processor 640 and/or scheduler 644 may generate scheduling information and/or other overhead information for the broadcast and multicast services.

Controller/processor 690 may implement processes for the techniques described herein. Memories 642 and 692 may store data and program codes for Node B 510 and UE 520, respectively. Accordingly, group communications in the eMBMS environment can be accomplished in accordance with the various embodiments disclosed herein, while still remaining compliant with the existing standards.

Figure 7:
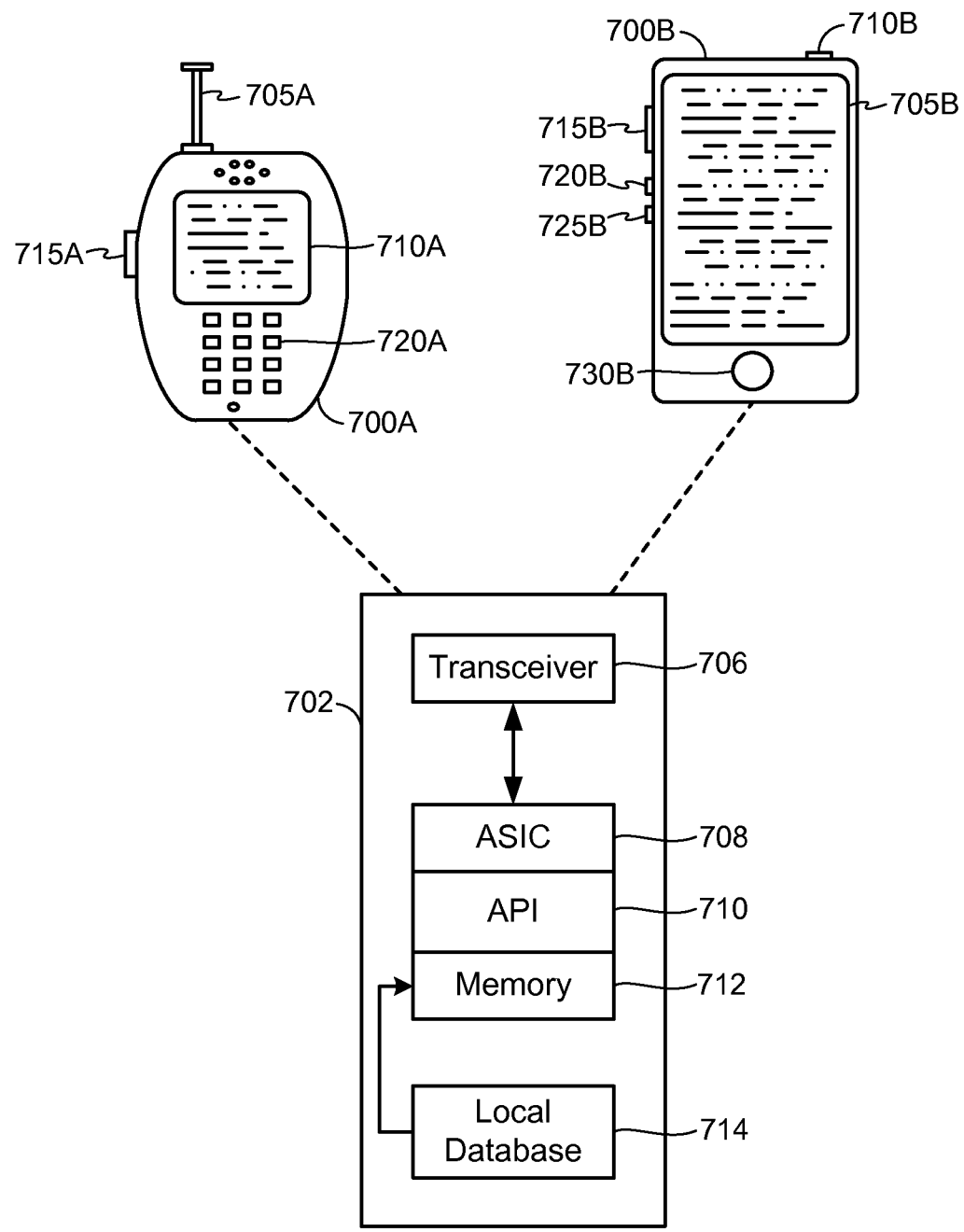
FIG. 7 illustrates examples of user equipments (UEs) in accordance with aspects of the disclosure.

FIG. 7 illustrates examples of UEs in accordance with aspects of the disclosure. Referring to FIG. 7, UE 700A is illustrated as a calling telephone and UE 700B is illustrated as a touchscreen device (e.g., a smart phone, a tablet computer, etc.). As shown in FIG. 7, an external casing of UE 700A is configured with an antenna 705A, display 710A, at least one button 715A (e.g., a PTT button, a power button, a volume control button, etc.) and a keypad 720A among other components, as is known in the art. Also, an external casing of UE 700B is configured with a touchscreen display 705B, peripheral buttons 710B, 715B, 720B and 725B (e.g., a power control button, a volume or vibrate control button, an airplane mode toggle button, etc.), at least one front-panel button 730B (e.g., a Home button, etc.), among other components, as is known in the art. While not shown explicitly as part of UE 700B, the UE 700B can include one or more external antennas and/or one or more integrated antennas that are built into the external casing of UE 700B, including but not limited to WiFi antennas, cellular antennas, satellite position system (SPS) antennas (e.g., global positioning system (GPS) antennas), and so on.

While internal components of UEs such as the UEs 700A and 700B can be embodied with different hardware configurations, a basic high-level UE configuration for internal hardware components is shown as platform 702 in FIG. 7. The platform 702 can receive and execute software applications, data and/or commands transmitted from the RAN 120 that may ultimately come from the core network 140, the Internet 175 and/or other remote servers and networks (e.g., application server 170, web URLs, etc.). The platform 702 can also independently execute locally stored applications without RAN interaction. The platform 702 can include a transceiver 706 operably coupled to an application specific integrated circuit (ASIC) 708, or other processor, microprocessor, logic circuit, or other data processing device. The ASIC 708 or other processor executes the application programming interface (API) 710 layer that interfaces with any resident programs in the memory 712 of the wireless device. The memory 712 can be comprised of read-only memory (ROM) or random-access memory (RAM), electrically erasable programmable ROM (EEPROM), flash cards, or any memory common to computer platforms. The platform 702 also can include a local database 714 that can store applications not actively used in memory 712, as well as other data. The local database 714 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 700A, 700B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 708, memory 712, API 710 and local database 714 may all be used cooperatively to load, store and execute the various functions disclosed herein and thus the logic to perform these functions may be distributed over various elements. Alternatively, the functionality could be incorporated into one discrete component. Therefore, the features of the UEs 700A and 700B in FIG. 7 are to be considered merely illustrative and the disclosure is not limited to the illustrated features or arrangement.

The wireless communication between the UEs 700A and/or 700B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the aspects of the disclosure and are merely to aid in the description of various aspects of the disclosure.

Figure 8:
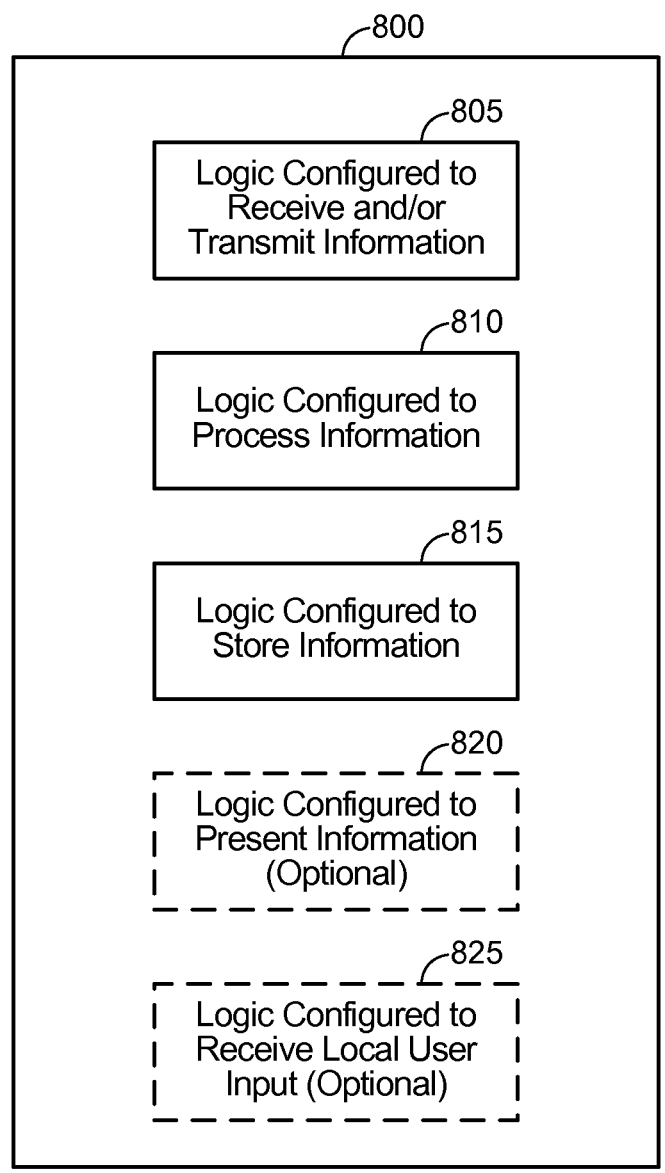
FIG. 8 illustrates a communication device that includes logic configured to receive and/or transmit information.

FIG. 8 illustrates a communication device 800 that includes logic configured to perform functionality. The communication device 800 can correspond to any of the above-noted communication devices, including but not limited to UEs 700A or 700B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 800 can correspond to any electronic device that is configured to communicate with (or facilitate communication with) one or more other entities over the wireless communications system 100 of FIG. 1.

Referring to FIG. 8, the communication device 800 includes logic configured to receive and/or transmit information 805. In an example, if the communication device 800 corresponds to a wireless communications device (e.g., UE 700A or 700B, one of BSs 200A through 210A, one of Node Bs 200B through 210B, one of eNodeBs 200D through 210D, etc.), the logic configured to receive and/or transmit information 805 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 805 can correspond to a wired communications interface (e.g., a serial connection, a USB or Firewire connection, an Ethernet connection through which the Internet 175 can be accessed, etc.). Thus, if the communication device 800 corresponds to some type of network-based server (e.g., PDSN, SGSN, GGSN, S-GW, P-GW, MME, HSS, PCRF, the application server 170, etc.), the logic configured to receive and/or transmit information 805 can correspond to an Ethernet card, in an example, that connects the network-based server to other communication entities via an Ethernet protocol. As an example, the logic configured to receive and/or transmit information 805 may include logic configured to send a registration request from a UE to a server, the registration request indicating one or more communications groups in which the UE is interested and optionally including the UE's intent to register with the server for group communication service, logic configured to receive a message from the server indicating a set of the one or more communications groups that have been assigned pre-established multicast resources, and logic configured to receive one or more call identifiers from the server, the one or more call identifiers mapped to group identifiers of each communications group in the set of the one or more communications groups. As another example, the logic configured to receive and/or transmit information 805 may include logic configured to receive a registration request from a UE, the registration request indicating one or more communications groups in which the UE is interested, logic configured to send a message to the UE indicating a set of the one or more communications groups and one or more mapped call identifiers, and logic configured to assign multiple group calls onto one or more pre-established multicast resources. In a further example, the logic configured to receive and/or transmit information 805 can include sensory or measurement hardware by which the communication device 800 can monitor its local environment (e.g., an accelerometer, a temperature sensor, a light sensor, an antenna for monitoring local RF signals, etc.). The logic configured to receive and/or transmit information 805 can also include software that, when executed, permits the associated hardware of the logic configured to receive and/or transmit information 805 to perform its reception and/or transmission function(s). However, the logic configured to receive and/or transmit information 805 does not correspond to software alone, and the logic configured to receive and/or transmit information 805 relies at least in part upon hardware to achieve its functionality.

Referring to FIG. 8, the communication device 800 further includes logic configured to process information 810. In an example, the logic configured to process information 810 can include at least a processor. Example implementations of the type of processing that can be performed by the logic configured to process information 810 includes but is not limited to performing determinations, establishing connections, making selections between different information options, performing evaluations related to data, interacting with sensors coupled to the communication device 800 to perform measurement operations, converting information from one format to another (e.g., between different protocols such as .wmv to .avi, etc.), and so on. For example, the logic configured to process information 810 may include logic configured to store a mapping of one or more call identifiers to group identifiers of each communications group in a set of the one or more communications groups and logic configured to maintain one or more group call sessions for the set of the one or more communications groups. As another example, the logic configured to process information 810 may include logic configured to determine that a UE is provisioned for pre-established group calls, logic configured to retrieve group identifiers for one or more communications groups, logic configured to map one or more call identifiers to the group identifiers of each communications group in a set of the one or more communications groups, and logic configured to assign multiple group calls onto one or more pre-established multicast resources. The processor included in the logic configured to process information 810 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 810 can also include software that, when executed, permits the associated hardware of the logic configured to process information 810 to perform its processing function(s). However, the logic configured to process information 810 does not correspond to software alone, and the logic configured to process information 810 relies at least in part upon hardware to achieve its functionality.

Referring to FIG. 8, the communication device 800 further includes logic configured to store information 815. In an example, the logic configured to store information 815 can include at least a non-transitory memory and associated hardware (e.g., a memory controller, etc.). For example, the non-transitory memory included in the logic configured to store information 815 can correspond to RAM, flash memory, ROM, erasable programmable ROM (EPROM), EEPROM, registers, hard disk, a removable disk, a CD-ROM, or any other form of storage medium known in the art. The logic configured to store information 815 can also include software that, when executed, permits the associated hardware of the logic configured to store information 815 to perform its storage function(s). However, the logic configured to store information 815 does not correspond to software alone, and the logic configured to store information 815 relies at least in part upon hardware to achieve its functionality. As an example, the logic configured to store information 815 may include logic configured to store a mapping of one or more call identifiers to group identifiers of each communications group in a set of the one or more communications groups and logic configured to maintain one or more group call sessions for the set of the one or more communications groups.

Referring to FIG. 8, the communication device 800 further optionally includes logic configured to present information 820. In an example, the logic configured to present information 820 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 800. For example, if the communication device 800 corresponds to UE 700A or UE 700B as shown in FIG. 7, the logic configured to present information 820 can include the display 710A of UE 700A or the touchscreen display 705B of UE 700B. In a further example, the logic configured to present information 820 can be omitted for certain communication devices, such as network communication devices that do not have a local user (e.g., network switches or routers, remote servers, etc.). The logic configured to present information 820 can also include software that, when executed, permits the associated hardware of the logic configured to present information 820 to perform its presentation function(s). However, the logic configured to present information 820 does not correspond to software alone, and the logic configured to present information 820 relies at least in part upon hardware to achieve its functionality.

Referring to FIG. 8, the communication device 800 further optionally includes logic configured to receive local user input 825. In an example, the logic configured to receive local user input 825 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 800. For example, if the communication device 800 corresponds to UE 700A or UE 700B as shown in FIG. 7, the logic configured to receive local user input 825 can include the keypad 720A, any of the buttons 715A or 710B through 725B, the touchscreen display 705B, etc. In a further example, the logic configured to receive local user input 825 can be omitted for certain communication devices, such as network communication devices that do not have a local user (e.g., network switches or routers, remote servers, etc.). The logic configured to receive local user input 825 can also include software that, when executed, permits the associated hardware of the logic configured to receive local user input 825 to perform its input reception function(s). However, the logic configured to receive local user input 825 does not correspond to software alone, and the logic configured to receive local user input 825 relies at least in part upon hardware to achieve its functionality.

Referring to FIG. 8, while the configured logics of 805 through 825 are shown as separate or distinct blocks in FIG. 8, it will be appreciated that the hardware and/or software by which the respective configured logic performs its functionality can overlap in part. For example, any software used to facilitate the functionality of the configured logics of 805 through 825 can be stored in the non-transitory memory associated with the logic configured to store information 815, such that the configured logics of 805 through 825 each performs their functionality (i.e., in this case, software execution) based in part upon the operation of software stored by the logic configured to store information 815. Likewise, hardware that is directly associated with one of the configured logics can be borrowed or used by other configured logics from time to time. For example, the processor of the logic configured to process information 810 can format data into an appropriate format before being transmitted by the logic configured to receive and/or transmit information 805, such that the logic configured to receive and/or transmit information 805 performs its functionality (i.e., in this case, transmission of data) based in part upon the operation of hardware (i.e., the processor) associated with the logic configured to process information 810.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 9:
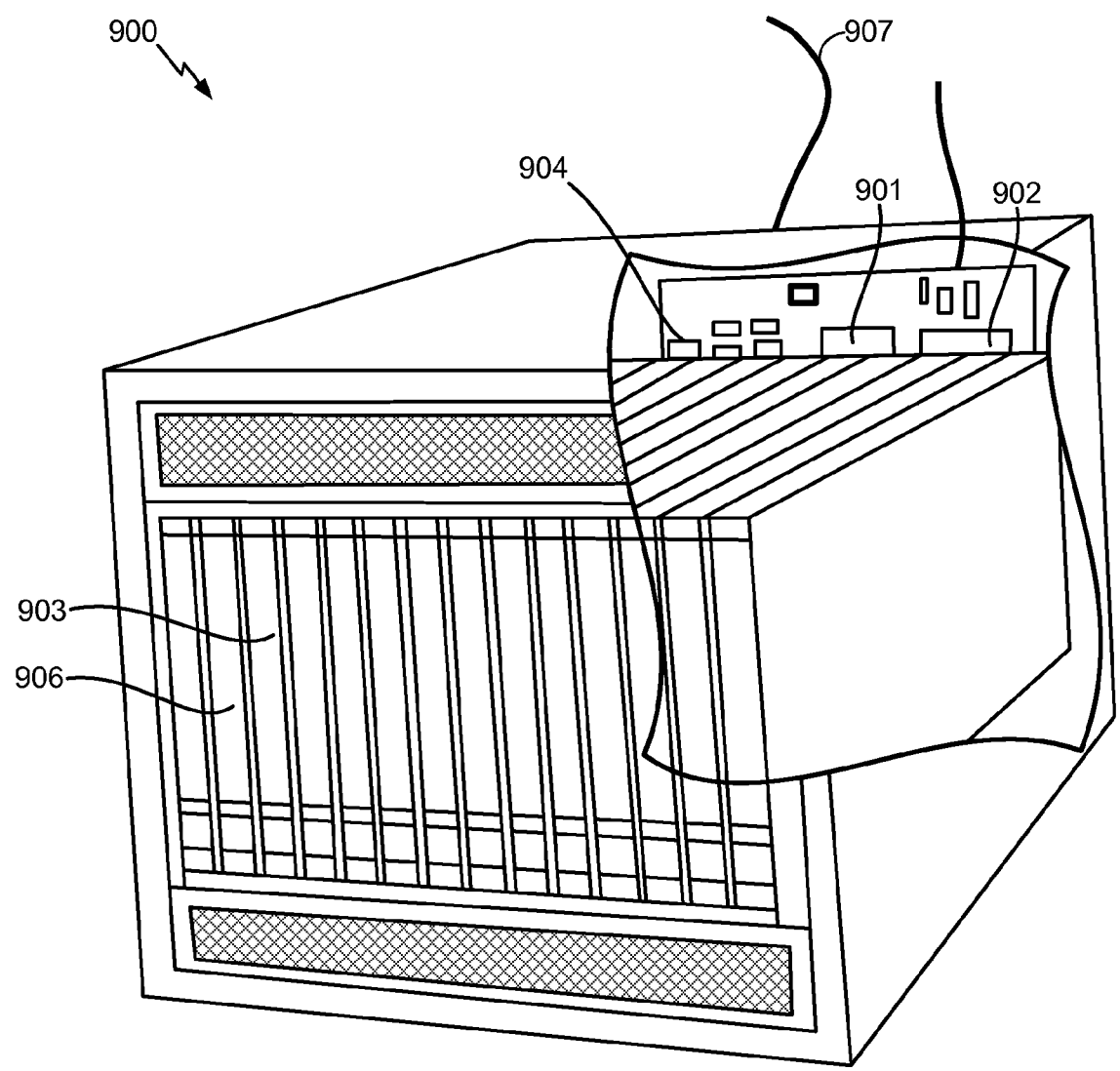
FIG. 9 illustrates an exemplary server according to various aspects of the disclosure.

The various embodiments may be implemented on any of a variety of commercially available server devices, such as server 900 illustrated in FIG. 9. In an example, the server 900 may correspond to one example configuration of the application server 170 described above. In FIG. 9, the server 900 includes a processor 901 coupled to volatile memory 902 and a large capacity nonvolatile memory, such as a disk drive 903. The server 900 may also include a floppy disc drive, compact disc (CD) or DVD disc drive 906 coupled to the processor 901. The server 900 may also include network access ports 904 coupled to the processor 901 for establishing data connections with a network 907, such as a local area network coupled to other broadcast system computers and servers or to the Internet. In context with FIG. 8, it will be appreciated that the server 900 of FIG. 9 illustrates one example implementation of the communication device 800, whereby the logic configured to transmit and/or receive information 805 corresponds to the network access points 904 used by the server 900 to communicate with the network 907, the logic configured to process information 810 corresponds to the processor 901, and the logic configuration to store information 815 corresponds to any combination of the volatile memory 902, the disk drive 903 and/or the disc drive 906. The optional logic configured to present information 820 and the optional logic configured to receive local user input 825 are not shown explicitly in FIG. 9 and may or may not be included therein. Thus, FIG. 9 helps to demonstrate that the communication device 800 may be implemented as a server, in addition to a UE implementation as in 705A or 705B as in FIG. 7.

For group communication services that require low latency and a short time to establish the group communication, the setup time of conventional multicast channels can be a detriment to system performance. For LTE, the broadcast multicast framework, i.e., eMBMS, supports semi-static bearer setup. The eMBMS bearers are setup by an out-of-band network procedure and the latency for setting up and detecting the available eMBMS bearers is not suitable for low latency group communications. To overcome this latency issue, in an eMBMS system, the multicast bearers need to be established before the call is started. This means that the target geographical area has to be identified and the network components be connected. Additionally, a group member list needs to be pre-provisioned in the application server interfacing with the eMBMS system.

In the conventional scheme, a call is pre-established in the unicast system and the UEs establish the session for the call and establish the core network bearers. The core network reserves resources for the call, and similarly, the multicast client on the UE reserves computing and vocoder resources for the call. Likewise, the application server reserves computing resources for the call. Thus, later, when the PTT button is pressed, for example, the system performs floor arbitration and the media can be delivered within a very short time.

This system works well for a single, pre-established group call. However, the system does not scale well when multiple calls need to be supported. The system has to deliver signaling for pre-establishing each such group call and, given that each pre-established call consumes resources on the UE, the network, and the application server, the resource utilization is not efficient. Even assuming that the network and the application server can be scaled well, resources on the UE are still fairly limited, thus computing resources on the UE, like memory, will be exhausted to support multiple pre-established calls using the current scheme.

Figure 10:
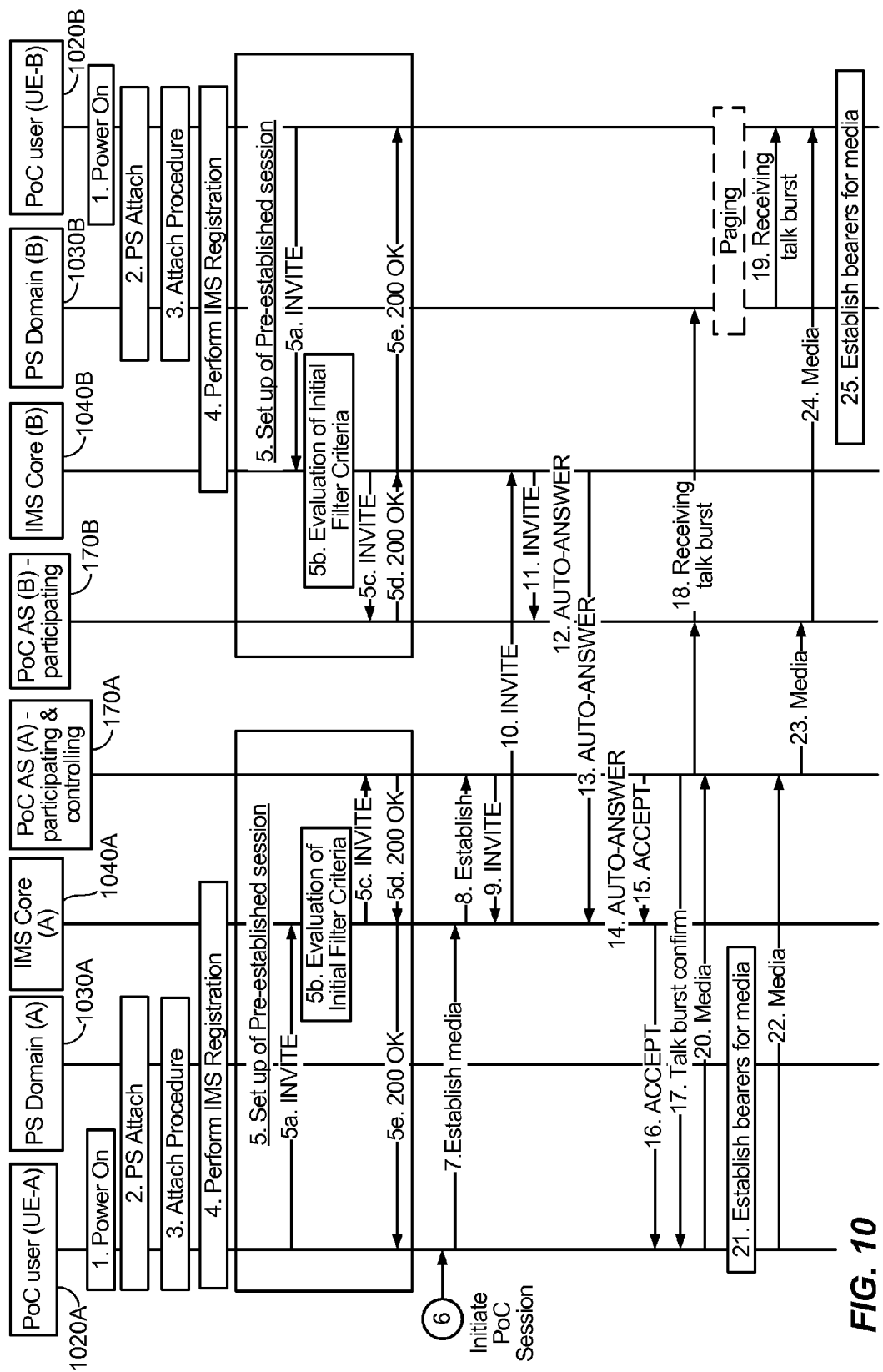
FIG. 10 illustrates an exemplary flow used in the prior art to establish PTT over cellular (PoC) communication based on pre-established session signaling.

FIG. 10 illustrates a sample Open Mobile Alliance (OMA) PTT over cellular (PoC) flow for pre-established calls. At step 1, each PoC user (UE 1020A and 1020B in the example of FIG. 10) is powered on. At step 2, UE 1020A and 1020B each perform the attach procedure in order to authenticate to the packet switched (PS) domains 1030A and 1030B, respectively. At step 3, each UE 1020A and 1020B ensures that a bearer suitable for IMS related signaling is established and, if necessary, ensures that an additional general purpose bearer with the same Access Point Name (APN) and IP address as the default bearer for IMS related signaling is established.

It should be noted that these steps may occur at different times for each PoC user, i.e., UE 1020A and 1020B. The use of the EPS bearer(s) depends on how the UE, the network, and the overall system are configured to operate. It should also be noted that, if allowed by the subscription and operator policy, the QoS of a pre-established EPS bearer for PoC talk burst control and media is allowed to have a higher QoS than best effort.

At step 4, each UE 1020A and 1020B performs the IMS registration with IMS cores 1040A and 1040B, respectively. At step 5, each UE 1020A and 1020B establishes the pre-established session for PoC communication towards the PoC application servers 170A and 170B, respectively. The INVITE request 5a contains the PoC service indication, and the Session Description Protocol (SDP) media parameters indicate the IP address obtained in step 3. At step 5b, the IMS Core 1040A/1040B identifies that this service indication matches filtering criteria for a pre-established session and, at step 5c, routes the session establishment request to the PoC application server 170A/170B. Conventionally, this session setup is on unicast bearers. However, this may be performed on eMBMS bearers as well.

In case a Service Based Local Policy is applied in the UE 1020A/1020B's IMS network, the IMS core 1040A/1040B generates an authorization token for the session, then, at step 5e, inserts and delivers the authorization token to the UE 1020A/1020B in the 2000K response upon set-up of the pre-established session.

To support monitoring of multiple simultaneous calls, steps 5a-5e are repeated for each call. Thus, for each call, a UE needs to maintain the state for each call.

At step 6, the PoC user A presses the PTT indication/button on the UE 1020A to indicate that he or she wishes to communicate with the user of UE 1020B. At steps 7 and 8, the UE 1020A requests the establishment of media transfer and sends a SIP REFER message, for example, to the PoC application server 170A via the IMS core 1040A, containing the address of the terminating user, i.e., UE 1020B.

At steps 9 to 11, the PoC application server 170A sends an INVITE request to the PoC application server 170B by means of the IMS core 1040A and the IMS core 1040B. At steps 12 to 14, the PoC application server 170B indicates an Auto-Answer to the PoC application server 170A via IMS core 1040B and IMS core 1040A. At steps 15 to 17, the PoC application server 170A acknowledges the media establishment request message and, at the same time, sends a talk burst confirmation to the UE 1020A. The talk burst control message is transferred to the UE 1020A on an EPS bearer established in step 3.

At steps 18 and 19, the PoC application server 170A informs the UE 1020B via the PoC application server 170B that talk bursts from the UE 1020A are on the way. Typically, the UE 1020B needs to be paged before the talk burst message can be transferred. Note that receiving the talk burst message is transparent to the PS domain 1030B.

At steps 20 and 21, after the UE 1020A receives both the acknowledgement for the media establishment request message and the talk burst confirmation message, the UE 1020A may send media data to the PoC application server 170A. In case of unicast transmission, the UE 1020A may establish an additional EPS bearer for media and talk burst control exchange with the same IP address and APN as the EPS bearers of step 3, such as an EPS bearer with traffic class streaming and the bandwidth required for the negotiated media parameters. If a UE received an authorization token in step 5, it inserts it into the EPS bearer signaling. As soon as the EPS bearer established in step 18 is available, the UE 1020A can use it.

At steps 22 to 24, the UE 1020A continues sending media. If and when the EPS bearer established in step 22 is available, the UE 1020A can use it. The UE 1020A sends the media data to the PoC application server 170A, which sends the media data to the UE 1020B via the PoC application server 170B.

At step 25, having received the talk burst message, the UE 1020B may establish an additional EPS bearer for media and talk burst control exchange with the same IP address and APN as the context(s) of step 3, such as an EPS bearer with traffic class streaming and the bandwidth required for the negotiated media parameters. If a UE received an authorization token in step 5, it inserts it into the EPS bearer signaling.

The eMBMS bearer discovery, activation, and delayed bearer notification process hinders the use of eMBMS for low call setup latency applications. However, given the network resource efficiency offered by eMBMS, it is the most suitable mechanism for large group communication in LTE, for example. To meet a low latency call setup requirement for interactive group communication, a pre-activated eMBMS bearer can be used. For such a pre-activated service, the application server establishes the bearer(s) for groups that require low call setup latency before any group call requests are allowed from the client(s).

One solution leverages eMBMS on the downlink for group communications by using pre-established eMBMS bearers for fast group communication setup. Unicast bearers are used for uplink communication and, in certain cases (e.g., where eMBMS is not supported), unicast is also used on the downlink. The solution uses the PCRF, such as PCRF 240D in FIG. 2D, as the interface between the application server, such as application server 170, and the BM-SC, such as BM-SC 536, for the exchange of eMBMS related control information.

Figure 11:
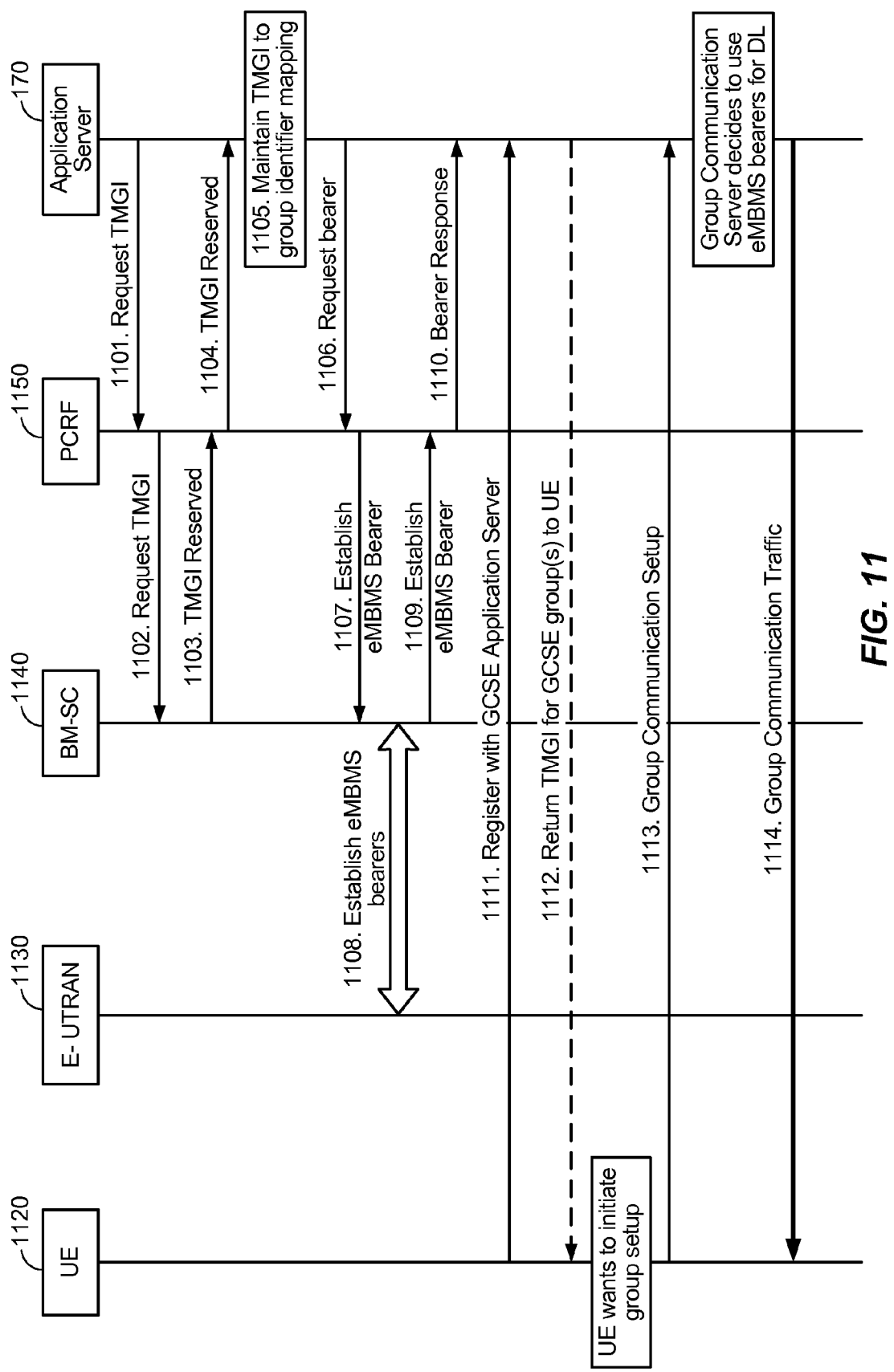
FIG. 11 illustrates an exemplary flow of interactions between a UE and the application server.

FIG. 11 illustrates an exemplary flow of interactions between a UE 1120 and the application server 170 according to an aspect of the disclosure. At 1101 to 1104, the application server 170 requests the Temporary Mobile Group Identifier(s) (TMGI(s)) for the group(s) to which the UE 1120 belongs from a BM-SC 1140 via the PCRF 1150. At 1105, the application server 170 creates a mapping of the TMGI(s) to group identifier(s).

At 1106 to 1110, pre-established eMBMS bearers are setup for the group(s). The corresponding MBSFN area is based on the eNBs that were pre-selected for this group communication as provided to the BM-SC 1140. At 1111, an application for group communication on the UE 1120 registers with an application service, such as a group communication application service. The register message may include all the group identifiers of the groups in which the UE 1120 is interested, e.g., all the groups to which the UE 1120 belongs. At 1112, the TMGI(s) of the group(s), if available, are returned to the UE 1120 as a part of successful registration. The UE 1120 maintains a mapping of the TMGI(s) to the group identifier(s).

At 1113, the UE 1120 monitors the network to determine the availability of the eMBMS transmission corresponding to the TMGI(s) of the interested group(s). When the TMGI(s) are active, the UE 1120 establishes the eMBMS logical and transport channels and continues to monitor traffic for the TMGI(s). The UE 1120 forwards any downlink user plane traffic on these channels to the group communication application.

The UE 1120 initiates group communication setup for a particular group using unicast uplink bearers. The UE 1120 also indicates the availability of the eMBMS transmission corresponding to the TMGI of the group in the group setup signalling. The application server 170 decides whether or not to use the pre-established eMBMS bearers for the downlink. At 1114, the application server 170 transmits the group communication traffic. If an eMBMS bearer is used for downlink, the evolved UTRAN (E-UTRAN) 1130 can further optimize the resource utilization by deciding to use point-to-point service or point-to-multipoint service (e.g., based on counting information).

Aspects of the disclosure enable the UE and the PTT application layer to be used to pre-establish and monitor multiple simultaneous group calls that require low call set up latency. This system allows the user to select one of the active groups and to request the floor to deliver the media.

The system uses an indication from the UE during registration to pre-establish calls. During registration, the application server retrieves the UE's group membership from its database and pre-establishes a session for the UE. The application server sends the UE a list of call identifiers mapped to each group in which the UE is interested. The UE then uses a call identifier for any in-call signaling.

Figure 12:
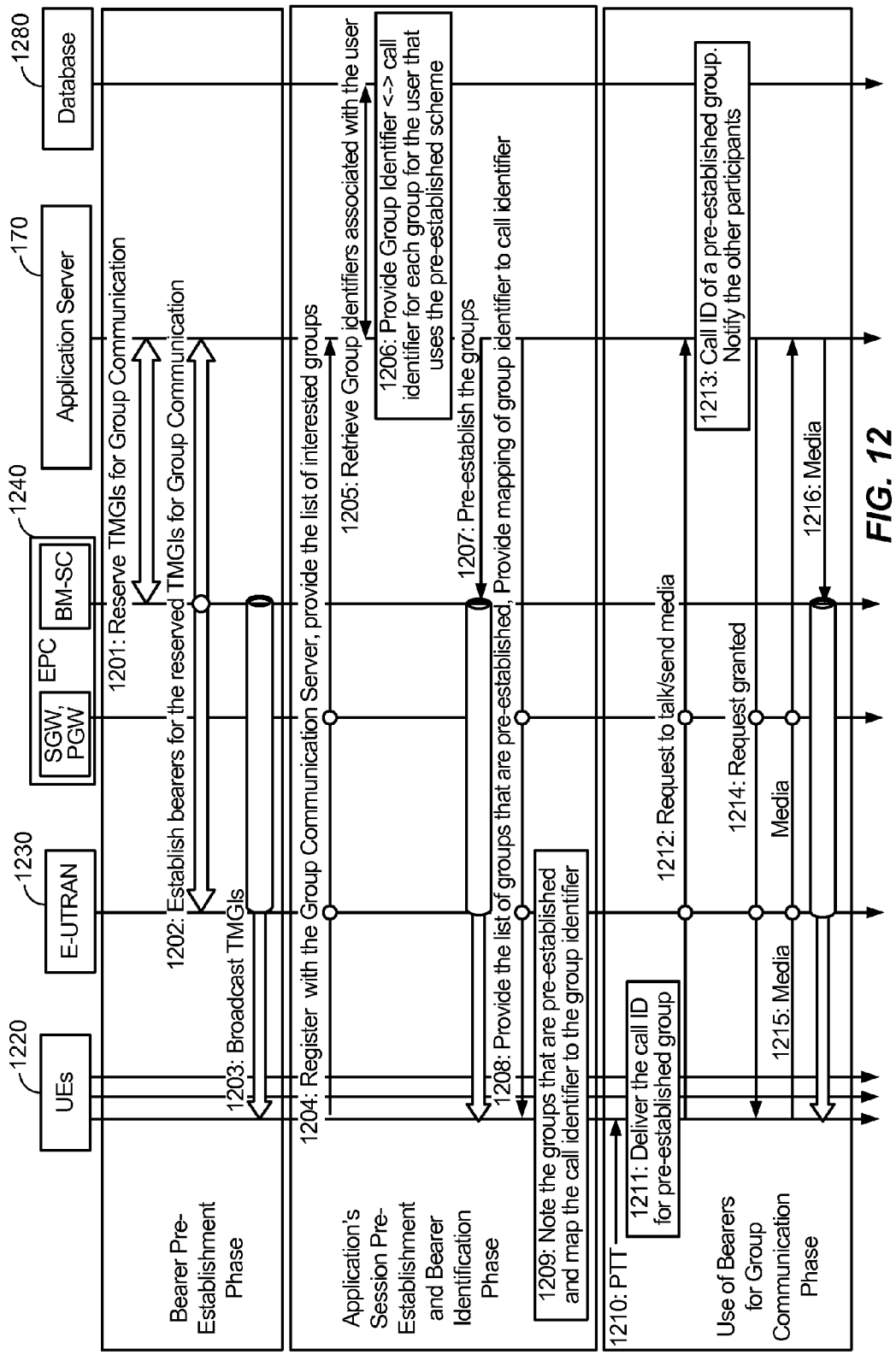
FIG. 12 illustrates an exemplary flow for pre-establishing multiple PTT calls according to an aspect of the disclosure.

FIG. 12 illustrates an exemplary flow for pre-establishing multiple PTT calls according to an aspect of the disclosure. The flow begins with a bearer pre-establishment phase. In the example of FIG. 12, a plurality of UEs 1220 forms a communications group. The communications group may be pre-determined, for example, a group of friends or coworkers using the same communications application, or may be determined on the fly, for example, all users within a given geographic area.

At 1201, a BM-SC in the EPC 1240 and the application server 170 reserve TMGI(s) for group communication. At 1202, the E-UTRAN(s) 1230, the BM-SC in the EPC 1240, such as BM-SC 236D in FIG. 2D, and the application server 170 communicate to establish bearers for the reserved TMGI(s). The BM-SC establishes the eMBMS bearers and, at 1203, broadcasts the TMGI(s) to the E-UTRAN(s) 1230. The E-UTRAN(s) 1230 then broadcasts the TMGI(s) to the UEs 1220. The TMGI(s) allow the UEs 1220 to know the group calls that are currently supported.

The flow illustrated in FIG. 12 continues with an application (such as a group communication application) session pre-establishment and bearer identification phase. At 1204, the UEs 1220 register with the application server 170 via the E-UTRAN 1230 and the SGW and the PGW in the EPC 1240, such as S-GW 230D and P-GW 235D in FIG. 2D, respectively, and provide a list of groups in which they are interested. At 1205, the application server 170 retrieves group identifiers associated with the interested groups from a database 1180. At 1206, the application server 170 maps the group identifiers to call identifiers for each group for the UEs 1220 that can use the pre-established bearer scheme, as described below.

At 1207, the application server 170 instructs the BM-SC in the EPC 1240 to pre-establish a certain number of bearers for the groups. The application server 170 may decide to multiplex multiple groups on the same bearer. Thus, if such a bearer exists, the application server 170 may not initiate the activation on a new bearer.

At 1208, the application server 170 sends the UEs 1220, on unicast bearers, a list of the pre-established groups and a mapping of the group identifiers to the corresponding call identifiers. The SGW and PGW in the EPC 1240 forward this information to the E-UTRAN 1230, which forwards it to the UEs 1220. At 1209, the UEs 1220 note the groups that are pre-established and map the call identifiers to the group identifiers.

Since the call is not active, the application server 170 does not allocate resources (e.g., memory) to the call and treats this as an idle call like other multiplexed calls.

The flow illustrated in FIG. 12 continues with a use of pre-established bearers for group communication phase. At 1210, a user of one of the UEs 1220 initiates a group call by, for example, pressing the PTT button to request the floor for a group call. At 1211, the UE selects the call identifier(s) corresponding to the group requested by the user for one of the pre-established groups and includes it in the generated request to talk or send media (i.e., the PTT floor request in the example of FIG. 12). The client may create another process dedicated to this now active call and dedicate memory resources for the call.

At 1212, the UE sends the request to talk or send media to the application server 170 via the E-UTRAN 1230 and the SGW and the PGW of the EPC 1240. At 1213, the application server 170 receives the call identifier of the pre-established group, looks up the corresponding group identifier using the call identifier, identifies the other participants in the group using the group identifier, and notifies the other participants (i.e., the remaining UEs 1220 in the example of FIG. 12). The application server 170 notifies the other participants using application layer signaling, either on the common eMBMS bearers used for the call or on dedicated bearers for target UEs, or a combination of both, depending on application layer methods. The application server 170 may create another process dedicated to this now active call and dedicate memory resources for the call.

At 1214, the application server 170 sends a floor request granted message to the calling UE on unicast bearers via the SGW and PGW of the EPC 1240 and the E-UTRAN 1230.

At 1215, the calling UE transmits a talk spurt or media for the group to the application server 170 via the E-UTRAN 1230, the SGW, and the PGW. At 1216, the application server 170 forwards the talk spurt or media to the other members of the group of UEs 1220 via the BM-SC of the EPC 1240 and the E-UTRAN 1230 on the common eMBMS bearers used for media delivery for the call or on dedicated bearers for target UEs, or a combination of both, depending on application layer methods.

The group identifier is a reference to a groups' collective static properties, such as:
- The need to re-establish the group call;
- Use of multicast resources;
- List of members;
- Capabilities of each member (i.e., QoS, data types supported, unicast, multicast capabilities, etc.);
- Use of multicast or unicast bearers for each participant;
- Authentication material for the group and the members;
- Media formats supported for the group (e.g., vocoders, audio, video, image type, half duplex, full duplex, etc.); and/or
- All other application layer specific parameters necessary to support the service (e.g., talker preemption ranks, geographic area, administrative area, billing and OAM formats, timers, call state information parameters, etc.)

The above properties do not change during the call. However, once a call is incident on the application server 170, certain properties are available or may change during the call. The collective reference of the static properties for a group referenced by the group identifier and the dynamic properties that are only available during call setup are referenced by the call identifier.

The call identifier refers to the following properties along with the group identifier:
- The IP address and ports of communication with the application server;
- The number of members participating in the call;
- The ports for communicating with the client;
- The source identifier (e.g., Synchronization Source (SSRC) for RTP packets);
- The call's session keys; and/or
- The selected media formats for the call (e.g., vocoder, video format, etc.).

For each group where the user is defined in the member list, the application server 170 provides the group identifier, the corresponding call identifier, and the corresponding TMGI. This mapping of the group identifier to the call identifier and the TMGI uniquely identifies the call. As such, the client receives a list of the above mapping for each group, which is referred to herein as providing a multiplexing of call identifiers to the UE in a single response.

By pre-establishing all the requisite calls for the user on the eMBMS system using a single request and by providing the call identifier, the system disclosed herein eliminates the need for multiple session requests, thereby optimizing signaling traffic. Further, by eliminating the need for separate context maintenance for each session, the system disclosed herein also reduces the memory constraints on the UE and the application server.

Figure 13:
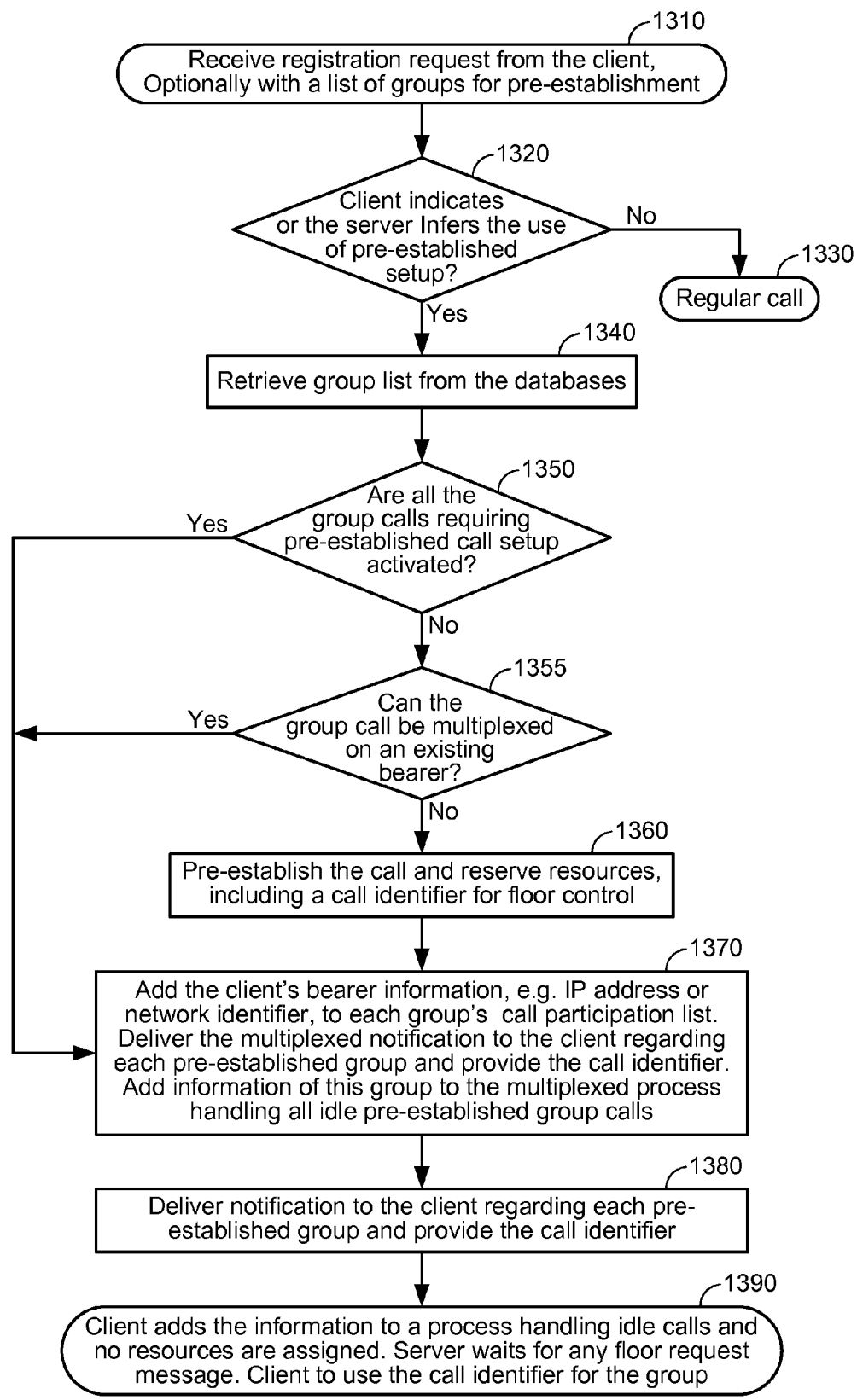
FIG. 13 illustrates an exemplary call pre-establishment flow according to an aspect of the disclosure.

FIG. 13 illustrates an exemplary call pre-establishment flow according to an aspect of the disclosure. The flow illustrated in FIG. 13 may be performed by an application server, such as application server 170. At 1310, the application server 170 receives a registration request from a client UE, which may optionally include a list of groups for pre-establishment. At 1320, the application server 170 determines whether or not the client UE has indicated the use of pre-established setup. Alternatively, as part of the registration, the application server 170 may retrieve user information from a group database within the application server 170, such as database 1180 in FIG. 11, to determine if the user is provisioned for pre-established group calls. If the application server 170 determines that the user is not provisioned for pre-established group calls or has not indicated pre-established calls, then at 1330, the application server 170 handles the communication as a regular call.

At 1340, however, if the client UE has indicated the use of pre-established call setup, the application server 170 retrieves the group list from the database, such as database 1180 in FIG. 11. At 1350, the application server 170 determines whether or not all the group calls requiring pre-established call setup are activated. If they are activated, then the flow proceeds to 1370. If they are not activated, then at 1355, the application server 170 determines whether or not the group call can be multiplexed on existing eMBMS bearers. If multiplexing is desired, then the flow proceeds to the call set up procedure at 1370. If the bearer is not pre-established and multiplexing on an existing bearer is not desired, then at 1360, the application server 170 pre-establishes the call and reserves resources for it, including a call identifier for floor control.

At 1370, if all of the group calls requiring pre-established call setup are activated, the application server 170 proceeds with call setup procedures and adds the client UE's bearer information, such as its IP address or network identifier, to each groups' call participation list. Thus, each group builds a list of participants and their unicast bearer information apart from the common eMBMS bearer information. The application server 170 then selects a call identifier to be used for in-call communication. Since the group is inactive, the application server 170 adds information about this group to a single process that handles idle calls and no resources are allocated for the call.

At 1380, the application server 170 delivers the multiplexed notification to the client UE regarding each pre-established group and provides the call identifier.

At 1390, the client UE adds the information to a process handling idle calls and no resources are assigned. The application server 170 waits for any floor request messages. When making a floor request, the client UE will use the call identifier for the group.

Figure 14:
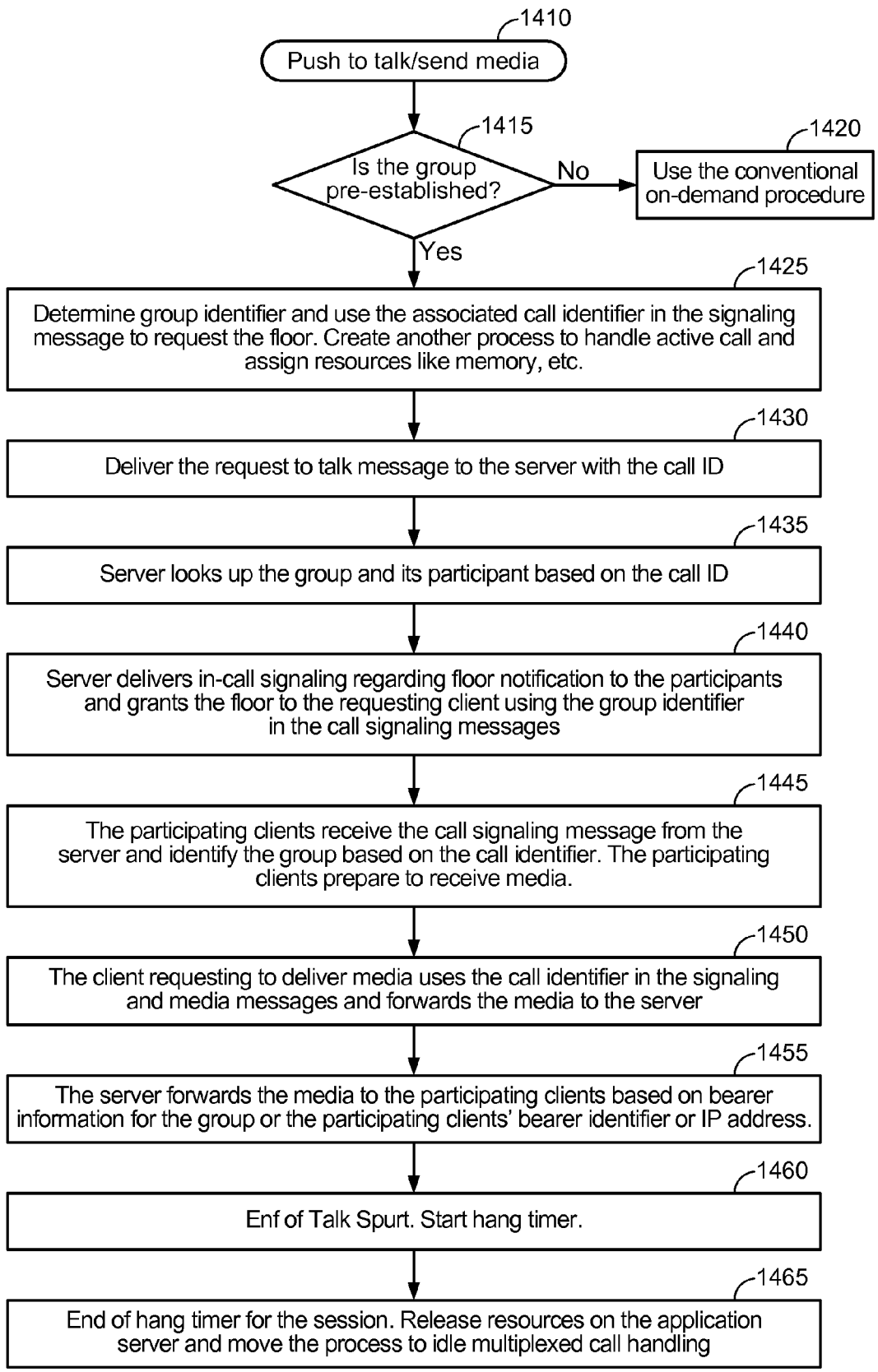
FIG. 14 illustrates an exemplary media exchange flow according to an aspect of the disclosure.

FIG. 14 illustrates an exemplary media exchange flow according to an aspect of the disclosure. Note that the application server, such as application server 170, and the UE do not have resources, such as memory, vocoder, microphone, etc., reserved for the calls that are idle. At 1410, a UE, such as UE 520, 700A, 700B, or 1120, detects that a user has pushed the PTT button for a particular group. For example, this can be based on the user interface (UI) showing the group from the contact list or reusing the last attempted call or any other means of selecting the group before or during the button press. At 1415, the UE determines whether or not the group to which the associated talk spurt or media will be sent has been pre-established. If it has not been, then at 1420, the UE uses the conventional on-demand procedure. If it has, however, then at 1425, the UE determines the group identifier for the PTT group and uses the associated call identifier in the signaling message to request the floor. At 1430, the UE sends the request to talk message to the application server, such as the application server 170, with the call identifier.

At 1435, the application server 170 looks up the group and its participants based on the call identifier. Since the group is active, the application server 170 creates a new process for the call and assigns resources. At 1440, the application server 170 delivers in-call signaling regarding the floor notification to the participants and grants the floor to the requesting UE using the group identifier in the call signaling messages.

At 1445, the participating client UEs monitoring the eMBMS bearers based on the TMGIs receive the call signaling message from the application server 170 and identify the group based on the call identifier. The participating client UEs prepare to receive the talk spurt or media.

At 1450, the client UE requesting the delivery of the talk spurt or media uses the call identifier in the signaling and media messages and forwards the media to the application server 170. At 1455, the application server 170 forwards the media to the participating client UEs based on their bearer identifiers or IP addresses. At 1460, the talk spurt or media transmission ends. The application server 170 starts a hang timer. At 1465, on expiry of the hang timer, the application server 170 releases the process assigning, thus releasing the memory resources assigned for the call. The network and eMBMS resources are still maintained.

Figure 15:
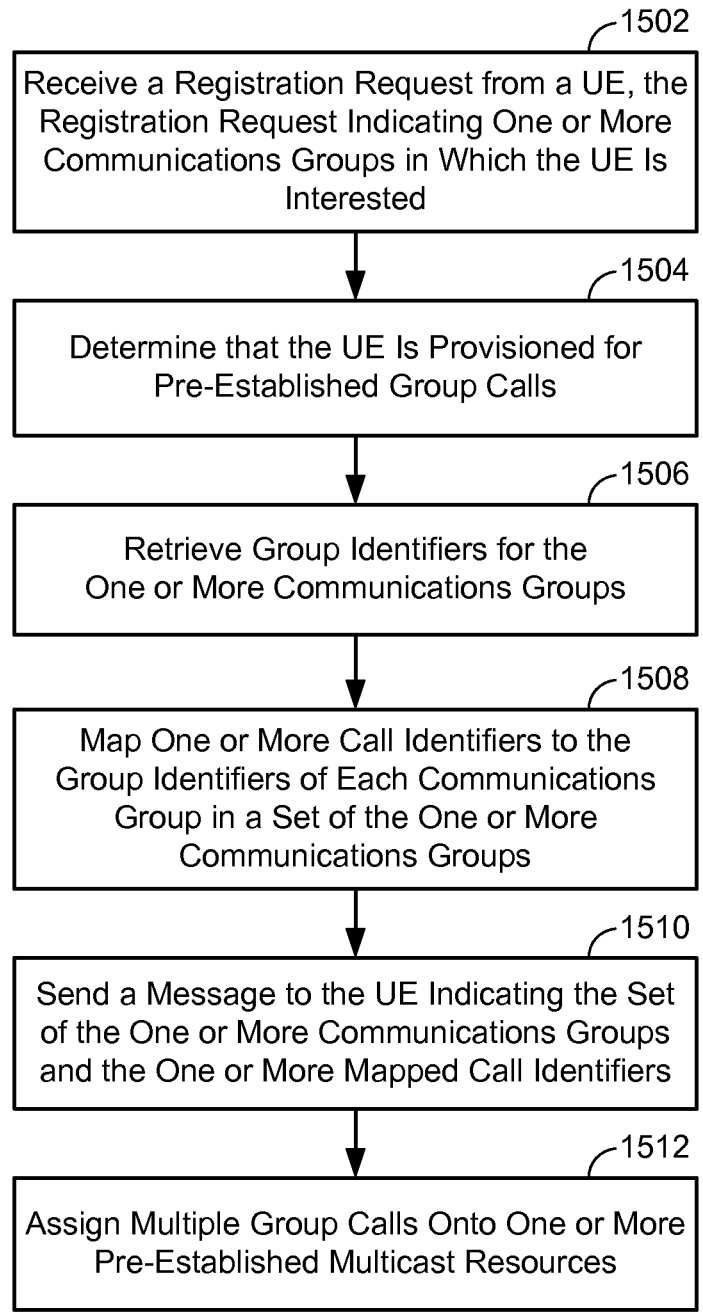
FIG. 15 illustrates an exemplary flow for group communications over multicast services according an aspect of the disclosure.

FIG. 15 illustrates an exemplary flow for group communications over MBMS or eMBMS according an aspect of the disclosure. The flow illustrated in FIG. 15 may be performed by a server, such as application server 170. At 1502, the server receives a registration request from a UE, such as at 1204 of FIG. 12 and/or 1310 of FIG. 13. The registration request may indicate one or more communications groups in which the UE is interested. At 1504, the server determines that the UE is provisioned for pre-established group calls, such as at 1320 of FIG. 13. At 1506, the server retrieves group identifiers for the one or more communications groups, such as at 1205 of FIG. 12 and/or 1340 of FIG. 13. At 1508, the sever maps one or more call identifiers to the group identifiers of each communications group in a set of the one or more communications groups, such as at 1206 of FIG. 12. At 1510, the server sends a message to the UE indicating the set of the one or more communications groups and the one or more mapped call identifiers, such as at 1208 of FIG. 12. At 1512, the server assigns multiple group calls onto one or more pre-established multicast resources, such as at 1355 and 1370 of FIG. 13.

Figure 16:
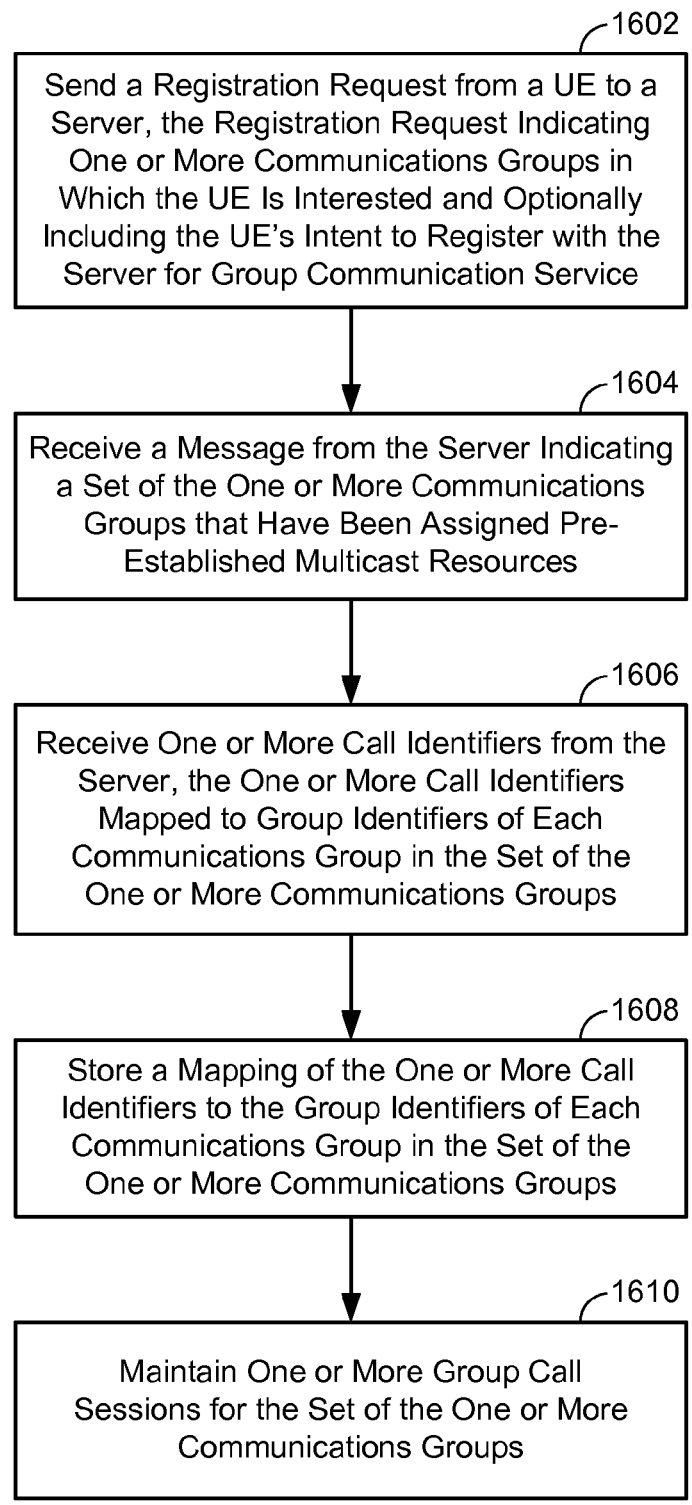
FIG. 16 illustrates an exemplary flow for group communications over multicast services according an aspect of the disclosure.

FIG. 16 illustrates an exemplary flow for group communications over MBMS or eMBMS according to an aspect of the disclosure. The flow illustrated in FIG. 16 may be performed by a UE, such as any of UEs 520, 700A, 700B, or 1120. At 1602, the UE sends a registration request to a server, such as application server 170, such as at 1204 of FIG. 12. The registration request may indicate one or more communications groups in which the UE is interested and, optionally, the UE's intent to register with the server for group communication service. At 1604, the UE receives a message from the server indicating a set of the one or more communications groups that have been assigned pre-established multicast resources, such as at 1207 of FIG. 12. At 1606, the UE receives one or more call identifiers from the server, the one or more call identifiers mapped to group identifiers of each communications group in the set of the one or more communications groups, such as at 1208 of FIG. 12. At 1608, the UE stores a mapping of the one or more call identifiers to the group identifiers of each communications group in the set of the one or more communications groups, such as at 1209 of FIG. 12. At 1610, the UE maintains one or more group call sessions for the set of the one or more communications groups, such as at 1209 of FIG. 12 and 1390 of FIG. 13.

The above-described aspects provide several advantages over the conventional art. For example, by using multiplexing techniques, the system disclosed herein uses minimal network and computing resources on the various devices (e.g., the application server and UEs). Also, a similar scheme can be extended to one-to-one calls, where the application server 170 provides an identifier for every combination of a user's contacts.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the disclosure can include a computer readable media embodying a method for group communications over eMBMS. Accordingly, the disclosure is not limited to illustrated examples and any means for performing the functionality described herein are included in embodiments of the invention.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method for group communications over multicast services, comprising:
sending a registration request from a user equipment (UE) to a server, the registration request indicating one or more communications groups in which the UE is interested and optionally including the UE's intent to register with the server for group communication service;
receiving a message from the server indicating a set of the one or more communications groups that have been assigned pre-established multicast resources, wherein the pre-established multicast resources include multimedia broadcast/multicast services (MBMS) bearers;

receiving one or more call identifiers from the server, the one or more call identifiers mapped to group identifiers of each communications group in the set of the one or more communications groups;

storing a mapping of the one or more call identifiers to the group identifiers of each communications group in the set of the one or more communications groups; and maintaining one or more group call sessions for the set of the one or more communications groups, wherein the server assigns multiple group calls to the pre-established multicast resources.

2. The method of claim 1, wherein maintaining the one or more group call sessions comprises maintaining call state information.

3. The method of claim 1, further comprising:
maintaining one group call session for the set of the one or more communications groups.

4. The method of claim 1, further comprising:
determining that the UE is provisioned for pre-established group calls.

5. The method of claim 1, further comprising:
sending a call request to the server, the call request including a call identifier corresponding to one of the set of the one or more communications groups.

6. The method of claim 5, further comprising:
receiving a request to establish a group call for a communications group;
determining a group identifier for the communications group; and
determining the call identifier based on the group identifier.

7. The method of claim 5, wherein the call request comprises a request to initiate a group call.

8. The method of claim 7, wherein the group call comprises a push-to-talk call.

9. The method of claim 5, further comprising:
adding information for the one of the set of the one or more communications groups to a process handling idle calls.

10. The method of claim 1, wherein the one or more call identifiers are mapped on common Temporary Mobile Group Identifiers (TMGIs).

11. A method for group communications over multicast services, comprising:
receiving a registration request from a user equipment (UE), the registration request indicating one or more communications groups in which the UE is interested;
determining that the UE is provisioned for pre-established group calls;
retrieving group identifiers for the one or more communications groups;
mapping one or more call identifiers to a group identifier of each communications group in a set of the one or more communications groups;
sending a message to the UE indicating the set of the one or more communications groups and the one or more mapped call identifiers; and
assigning multiple group calls onto one or more pre-established multicast resources, wherein the one or more pre-established multicast resources include multimedia broadcast/multicast services (MBMS) bearers, and
wherein the UE maintains one or more group call sessions for the set of the one or more communications groups.

12. The method of claim 11, further comprising:
pre-establishing the one or more multicast resources for the set of the one or more communications groups.

13. The method of claim 11, wherein the assigning the multiple group calls onto the one or more pre-established multicast resources comprises multiplexing the multiple group calls onto the one or more pre-established multicast resources.

14. The method of claim 11, further comprising:
sending the message to one or more target UEs indicating the set of the one or more communications groups and the one or more mapped call identifiers.

15. The method of claim 11, wherein the UE maintaining the one or more group call sessions comprises the UE maintaining call state information, and wherein a server maintains call state information.

16. The method of claim 11, further comprising:
receiving a call request from the UE, the call request including a call identifier provided by a server;
identifying a list of participants of a communications group based on the call identifier; and
transmitting a call notification to the list of participants.

17. The method of claim 16, further comprising:
receiving a floor request from the UE, the floor request including the call identifier.

18. The method of claim 16, wherein the call request comprises a request to initiate a group call.

19. The method of claim 18, wherein the group call comprises a push-to-talk call.

20. The method of claim 16, further comprising:
determining whether or not a group call corresponding to the call request can be multiplexed onto the one or more pre-established multicast resources.

21. The method of claim 16, further comprising:
adding information for the communications group to a multiplexed process handling all idle pre-established group calls.

22. The method of claim 11, further comprising:
releasing the one or more pre-established multicast resources upon an expiration of a hang timer; and
reassigning an assignment process to idle multiplexed call handling.

23. The method of claim 11, wherein the one or more call identifiers are mapped on common Temporary Mobile Group Identifiers (TMGIs).

24. An apparatus for group communications over multicast services, comprising:
logic configured to send a registration request from a user equipment (UE) to a server, the registration request indicating one or more communications groups in which the UE is interested and optionally including the UE's intent to register with the server for group communication service;
logic configured to receive a message from the server indicating a set of the one or more communications groups that have been assigned pre-established multicast resources, wherein the pre-established multicast resources include multimedia broadcast/multicast services (MBMS) bearers;
logic configured to receive one or more call identifiers from the server, the one or more call identifiers mapped to group identifiers of each communications group in the set of the one or more communications groups;
logic configured to store a mapping of the one or more call identifiers to the group identifiers of each communications group in the set of the one or more communications groups; and
logic configured to maintain one or more group call sessions for the set of the one or more communications groups, wherein the server assigns multiple group calls to the pre-established multicast resources.

25. The apparatus of claim 24, wherein the logic configured to maintain the one or more group call sessions comprises logic configured to maintain call state information.

26. The apparatus of claim 24, further comprising:
logic configured to maintain one group call session for the set of the one or more communications groups.

27. The apparatus of claim 24, further comprising:
logic configured to determine that the UE is provisioned for pre-established group calls.

28. The apparatus of claim 24, further comprising:
logic configured to send a call request to the server, the call request including a call identifier corresponding to one of the set of the one or more communications groups.

29. The apparatus of claim 28, further comprising:
logic configured to receive a request to establish a group call for a communications group;
logic configured to determine a group identifier for the communications group; and
logic configured to determine the call identifier based on the group identifier.

30. The apparatus of claim 28, wherein the call request comprises a request to initiate a group call.

31. The apparatus of claim 30, wherein the group call comprises a push-to-talk call.

32. The apparatus of claim 28, further comprising:
logic configured to add information for the one of the set of the one or more communications groups to a process handling idle calls.

33. The apparatus of claim 24, wherein the one or more call identifiers are mapped on common Temporary Mobile Group Identifiers (TMGIs).

34. An apparatus for group communications over multicast services, comprising:
logic configured to receive a registration request from a user equipment (UE), the registration request indicating one or more communications groups in which the UE is interested;
logic configured to determine that the UE is provisioned for pre-established group calls;
logic configured to retrieve group identifiers for the one or more communications groups;
logic configured to map one or more call identifiers to a group identifier of each communications group in a set of the one or more communications groups;
logic configured to send a message to the UE indicating the set of the one or more communications groups and the one or more mapped call identifiers; and
logic configured to assign multiple group calls onto one or more pre-established multicast resources, wherein the one or more pre-established multicast resources include multimedia broadcast/multicast services (MBMS) bearers, and
wherein the UE maintains one or more group call sessions for the set of the one or more communications groups.

35. The apparatus of claim 34, further comprising:
logic configured to pre-establish the one or more multicast resources for the set of the one or more communications groups.

36. The apparatus of claim 34, wherein the logic configured to assign the multiple group calls onto the one or more pre-established multicast resources comprises logic configured to multiplex the multiple group calls onto the one or more pre-established multicast resources.

37. The apparatus of claim 34, further comprising:
logic configured to send the message to one or more target UEs indicating the set of the one or more communications groups and the one or more mapped call identifiers.

38. The apparatus of claim 34, wherein the UE maintaining the one or more group call sessions comprises the UE maintaining call state information, and wherein a server maintains call state information.

39. The apparatus of claim 34, further comprising:
logic configured to receive a call request from the UE, the call request including a call identifier provided by a server;
logic configured to identify a list of participants of a communications group based on the call identifier; and
logic configured to transmit a call notification to the list of participants.

40. The apparatus of claim 39, further comprising:
logic configured to receive a floor request from the UE, the floor request including the call identifier.

41. The apparatus of claim 39, wherein the call request comprises a request to initiate a group call.

42. The apparatus of claim 41, wherein the group call comprises a push-to-talk call.

43. The apparatus of claim 39, further comprising:
logic configured to determine whether or not a group call corresponding to the call request can be multiplexed onto the one or more pre-established multicast resources.

44. The apparatus of claim 39, further comprising:
logic configured to add information for the communications group to a multiplexed process handling all idle pre-established group calls.

45. The apparatus of claim 34, further comprising:
logic configured to release the one or more pre-established multicast resources upon an expiration of a hang timer; and
logic configured to reassign an assignment process to idle multiplexed call handling.

46. The apparatus of claim 34, wherein the one or more call identifiers are mapped on common Temporary Mobile Group Identifiers (TMGIs).

47. An apparatus for group communications over multicast services, comprising:
means for sending a registration request from a user equipment (UE) to a server, the registration request indicating one or more communications groups in which the UE is interested and optionally including the UE's intent to register with the server for group communication service;
means for receiving a message from the server indicating a set of the one or more communications groups that have been assigned pre-established multicast resources, wherein the pre-established multicast resources include multimedia broadcast/multicast services (MBMS) bearers;
means for receiving one or more call identifiers from the server, the one or more call identifiers mapped to group identifiers of each communications group in the set of the one or more communications groups;
means for storing a mapping of the one or more call identifiers to the group identifiers of each communications group in the set of the one or more communications groups; and
means for maintaining one or more group call sessions for the set of the one or more communications groups, wherein the server assigns multiple group calls to the pre-established multicast resources.

48. An apparatus for group communications over multicast services, comprising:
- means for receiving a registration request from a user equipment (UE), the registration request indicating one or more communications groups in which the UE is interested;
- means for determining that the UE is provisioned for pre-established group calls;
- means for retrieving group identifiers for the one or more communications groups;
- means for mapping one or more call identifiers to a group identifier of each communications group in a set of the one or more communications groups;
- means for sending a message to the UE indicating the set of the one or more communications groups and the one or more mapped call identifiers; and
- means for assigning multiple group calls onto one or more pre-established multicast resources, wherein the one or more pre-established multicast resources include multimedia broadcast/multicast services (MBMS) bearers, and
- wherein the UE maintains one or more group call sessions for the set of the one or more communications groups.

49. A non-transitory computer-readable medium for group communications over multicast services, comprising:
- at least one instruction to send a registration request from a user equipment (UE) to a server, the registration request indicating one or more communications groups in which the UE is interested and optionally including the UE's intent to register with the server for group communication service;
- at least one instruction to receive a message from the server indicating a set of the one or more communications groups that have been assigned pre-established multicast resources, wherein the pre-established multicast resources include multimedia broadcast/multicast services (MBMS) bearers;
- at least one instruction to receive one or more call identifiers from the server, the one or more call identifiers mapped to group identifiers of each communications group in the set of the one or more communications groups;
- at least one instruction to store a mapping of the one or more call identifiers to the group identifiers of each communications group in the set of the one or more communications groups; and
- at least one instruction to maintain one or more group call sessions for the set of the one or more communications groups,
- wherein the server assigns multiple group calls to the pre-established multicast resources.

50. A non-transitory computer-readable medium for group communications over multicast services, comprising:
- at least one instruction to receive a registration request from a user equipment (UE), the registration request indicating one or more communications groups in which the UE is interested;
- at least one instruction to determine that the UE is provisioned for pre-established group calls;
- at least one instruction to retrieve group identifiers for the one or more communications groups;
- at least one instruction to map one or more call identifiers to a group identifier of each communications group in a set of the one or more communications groups;
- at least one instruction to send a message to the UE indicating the set of the one or more communications groups and the one or more mapped call identifiers; and
- at least one instruction to assign multiple group calls onto one or more pre-established multicast resources, wherein the one or more pre-established multicast resources include multimedia broadcast/multicast services (MBMS) bearers, and
- wherein the UE maintains one or more group call sessions for the set of the one or more communications groups.

* * * * *